United States Patent
Tsang

(10) Patent No.: US 10,168,667 B2
(45) Date of Patent: Jan. 1, 2019

(54) FAST GENERATION OF DIGITAL HOLOGRAMS

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 0 days.

(21) Appl. No.: 14/841,638

(22) Filed: Aug. 31, 2015

(65) Prior Publication Data

US 2017/0060089 A1     Mar. 2, 2017

(51) Int. Cl.
*G03H 1/08* (2006.01)
*G03H 1/22* (2006.01)

(52) U.S. Cl.
CPC ......... *G03H 1/0808* (2013.01); *G03H 1/2294* (2013.01); *G03H 2001/2297* (2013.01);
(Continued)

(58) Field of Classification Search
CPC ...... G03H 1/2294; G03H 1/0005; G03H 1/08; G03H 1/0841; G03H 1/0443;
(Continued)

(56) References Cited

U.S. PATENT DOCUMENTS

| 7,636,184 B2* | 12/2009 | Schwerdtner | ........ | G03H 1/2294 359/29 |
| 2012/0050460 A1* | 3/2012 | Tsang | ................... | G03H 1/0808 348/40 |

(Continued)

FOREIGN PATENT DOCUMENTS

| CN | 103226842 A | 7/2013 |
| EP | 2620818 | 7/2013 |

OTHER PUBLICATIONS

Shimobaba, et al., "Rapid calculation algorithm of Fresnel computer-generated-hologram using look-up table and wavefront-recording plane methods for three-dimensional display," Sep. 13, 2010 / vol. 18, No. 19 / Optics Express, pp. 19504-19509 (2010). Retrieved on Dec. 17, 2015, 6 pages.

(Continued)

*Primary Examiner* — Jade R Chwasz

(74) *Attorney, Agent, or Firm* — Amin, Turocy & Watson, LLP

(57) ABSTRACT

Fast processing of information represented in digital holograms is provided to facilitate generating a hologram for displaying three-dimensional (3-D) holographic images representative of a 3-D object scene on a display device. A holographic generator component (HGC) can receive or generate visual images, comprising depth and parallax information, of a 3-D object scene. A hologram processor component can apply a first non-uniform transform to a visual image to generate a first signal, and can apply a second transform to the first signal to generate a second signal that corresponds to a hologram that represents the 3-D object scene. The hologram can be illuminated with a light beam to facilitate generating a holographic image(s) that can be a reconstructed image that reconstructs the 3-D object scene. A display component can display the holographic image(s) for viewing by an observer.

34 Claims, 14 Drawing Sheets

(52) U.S. Cl.
CPC ... *G03H 2210/30* (2013.01); *G03H 2210/441* (2013.01); *G03H 2226/02* (2013.01)

(58) Field of Classification Search
CPC ............. G03H 1/0866; G03H 2226/02; G03H 2001/2297; G03H 2001/0825; G03H 1/0808; G03H 2001/0816; G03H 2001/0833; G03H 2001/0858; G03H 2210/40; G03H 2210/44; G03H 1/10; G03H 1/14
USPC .................. 359/9, 10, 11, 21, 22, 29, 35
See application file for complete search history.

(56) References Cited

U.S. PATENT DOCUMENTS

| | | | |
|---|---|---|---|
| 2013/0188233 A1 | 7/2013 | Nam | |
| 2014/0022239 A1* | 1/2014 | Ming | G03H 1/0808 345/419 |
| 2014/0210942 A1* | 7/2014 | Tsang | G03H 1/0486 348/40 |

OTHER PUBLICATIONS

Tsang, et al., "Fast generation of Fresnel holograms based on multirate filtering," Dec. 1, 2009 / vol. 48, No. 34 / Applied Optics, pp. H23-H30 (2009).Retrieved on Dec. 17, 2015, 8 pages.

Wakunami, et al., "Occlusion processing for computer generated hologram by conversion between the wavefront and light-ray information", J. Phys.: Conf. Ser. 415 012047, 2013. Retrieved on Dec. 17, 2015, 7 pages.

Wakunami, et al., "Calculation for computer generated hologram using ray-sampling plane," May 9, 2011 / vol. 19, No. 10 / Optics Express, pp. 9086-9101 (2011). Retrieved on Dec. 17, 2015, 16 pages.

Im et al. "Phase-regularized polygon computer-generated holograms," Optics Letters / vol. 39, No. 12 / Jun. 15, 2014, pp. 3642-3645 (2014).

Matsushima, et al., "Extremely high-definition full-parallax computer-generated hologram created by the polygon-based method," Applied Optics / vol. 48, No. 34 / Dec. 1, 2009, pp. H54-H63 (2009). Retrieved on Dec. 17, 2015, 10 pages.

Kim et al., "Effective memory reduction of the novel look-up table with onedimensional sub-principle fringe patterns in computer-generated holograms," May 21, 2012 / vol. 20, No. 11 / Optics Express, pp. 12021-12034 (2012). Retrieved on Dec. 17, 2015, 14 pages.

Kim et al., "Fast computation of hologram patterns of a 3D object using run-length encoding and novel look-up table methods," Applied Optics / vol. 48, No. 6 / Feb. 20, 2009, pp. 1030-1041 (2009).

Kim et al. "Effective generation of digital holograms of three-dimensional objects using a novel look-up table method," Jul. 1, 2008, vol. 47, No. 19, Applied Optics, pp. D55-D62 (2008).

Yamaguchi, et al. "Real-time image plane full-color and full-parallax holographic video display system," Optical Engineering 46(12), Dec. 2007, 8 pages.

Sakata, et al. "Fast computation method for a Fresnel hologram using three dimensional affine transformations in real space," Applied Optics / vol. 48, No. 34 / Dec. 1, 2009, pp. H212-H221 (2009).

Murano et al., "Fast computation of computer-generated hologram using Xeon Phi coprocessor," Comput. Phys. Commun. 185(10), 2742-2757 (2014). Retrieved on Dec. 17, 2015, 26 pages.

Sugiyama, et al., "Acceleration of computer-generated hologram by greatly reduced array of processor element with data reduction," Optical Engineering 53(11), 113104 (Nov. 2014), 6 pages.

Shimobaba et al., "Fast calculation of computer-generated hologram on AMD HD5000 series GPU and OpenCL," May 10, 2010 / vol. 18, No. 10 / Optics Express, pp. 9955-9960 (2010). Retrieved on Dec. 17, 2015, 6 pages.

Shimobaba et al. "Computer holography using wavefront recording method," in Digital Holography and Three-Dimensional Imaging, OSA Technical Digest (online), 2013, OSA, paper DTu1A.2. 3 pages.

Tsang et al. "Fast generation of digital holograms based on warping of the wavefront recording plane" Mar. 23, 2015, vol. 23, No. 6, Optics Express, 7 pages.

\* cited by examiner

500

600

FAST GENERATION OF DIGITAL HOLOGRAMS

TECHNICAL FIELD

The subject disclosure relates generally to holograms, e.g., to fast generation of digital holograms.

BACKGROUND

With the advancement of computers, digital holography has become an area of interest and has gained popularity. Research findings derived from this technology can enable digital holograms to be captured optically or generated numerically, and to be displayed with holographic display devices such as a liquid crystal on silicon (LCoS) display device or a spatial light modulator (SLM) display device. Holograms generated in this manner can be in the form of numerical data that can be recorded, transmitted, and processed using digital techniques. On top of that, the availability of high capacity digital storage and wide-band communication technologies also lead to the emergence of real-time video holography, casting light on the future of, for example, a three-dimensional (3-D) television system.

A Fresnel hologram of a 3-D scene can be generated numerically by computing the fringe patterns emerged from each object point to the hologram plane. The Fresnel hologram of the 3-D scene can be used to reconstruct and display 3-D holographic images that can recreate or represent the original 3-D scene from various visual perspectives (e.g., various viewing angles).

A hologram is often considered to be the ultimate solution to 3-D display, as it can record the complex wavefront emitted from a 3-D object scene. A complex hologram can reproduce desirable (e.g., excellent quality) 3-D images that can be free from the unwanted images that can be present in other types of holograms (e.g., amplitude). A desirable scenario can be displaying the complex hologram with a single complex device, employing illumination with a coherent light source (e.g., a light-emitting diode (LED) source).

The above-described description is merely intended to provide a contextual overview relating to holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to processing and generating holograms. Disclosed herein is a system comprising at least one memory that stores executable components, at least one processor, coupled to the at least one memory, that executes or facilitates execution of the executable components. The executable components comprise a holographic generator component that receives or generates a visual image that represents an object scene. The executable components also comprise a hologram processor component that applies a first transform to the visual image to generate a first signal, and applies a second transform to the first signal to generate a second signal that corresponds to a hologram that represents the object scene.

Also disclosed herein is a method that comprises generating, by a system comprising a processor, a signal based at least in part on a non-uniform transform applied to a visual image that represents an object scene. The method also comprises generating, by the system, a hologram that represents the object scene based at least in part on another transform applied to the signal.

Further disclosed herein is a non-transitory computer-readable medium storing computer-executable instructions that, in response to execution, cause a system comprising a processor to perform operations. The operations comprise applying a first transform to a visual image that represents an object scene to generate a first signal. The operations also comprise applying a second transform to the first signal to generate a second signal that corresponds to a hologram that represents the object scene.

The disclosed subject matter also includes a system comprising means for generating a signal based at least in part on applying a non-uniform transform to a visual image that represents an object scene. The system also comprises means for generating a hologram that represents the object scene based at least in part on applying another transform to the signal.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
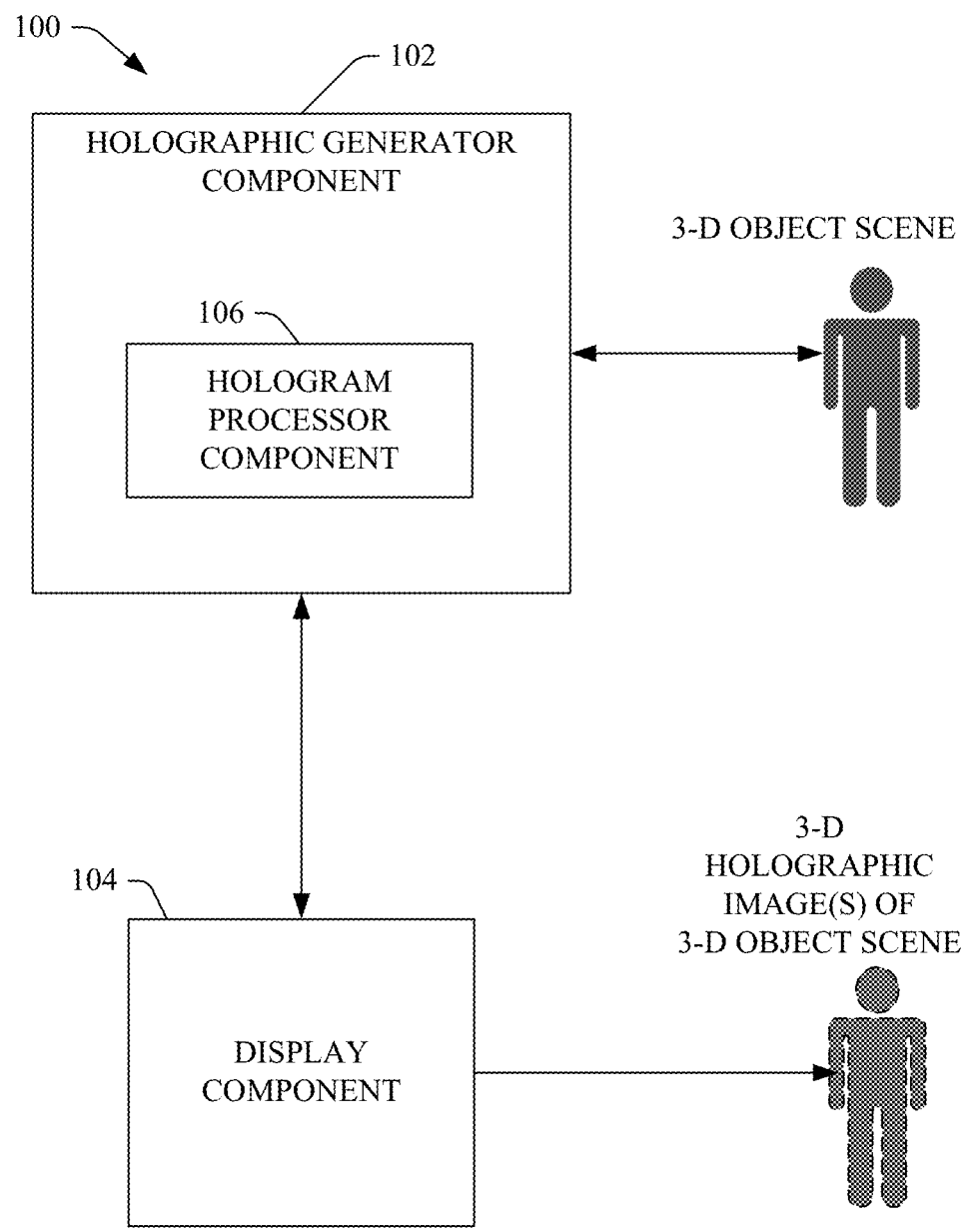
FIG. 1 illustrates a block diagram of an example system that can efficiently and quickly (e.g., in real time or at least near real time) generate a hologram(s) of a real or synthetic three-dimensional (3-D) object scene(s), and display 3-D holographic images, based at least in part on the hologram(s), in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

A complex hologram (e.g., complex digital hologram) can be a two-dimensional (2-D) complex image (e.g., an image comprising a real portion and an imaginary portion of the image) that records a three-dimensional (3-D) object scene. When the complex hologram is illuminated with a coherent beam, such as a light-emitting diode (LED) beam, the 3-D object scene can be reconstructed, via holographic images, and observable by the human eyes directly.

The exploration of fast generation of digital holograms has been an area of interest in the past two decades with the ultimate objective of generating holograms of 3-D object scenes at video rates (e.g., 25 to 30 frames per second). Attempts have been made to simplify the computationally intensive hologram generation process. For example, moderate reduction in computation time for hologram generation has been achieved through the use of look-up tables, virtual windows, multi-rate filters, and patch models. There also are conventional techniques that utilize hardware devices to speed up, to some degree, some of the core processes used to generate holograms. One of the faster approaches is a conventional wavefront recording plane (WRP) method of T. Shimobaba, N. Okada, T. Kakue, N. Masuda, Y. Ichihashi, R. Oi, K. Yamamoto, and T. Ito, "Computer holography using wavefront recording method," Digital Holography and Three-Dimensional Imaging, OSA Technical Digest (online), OSA, paper DTu1A.2 (2013), and T. Shimobaba, H. Nakayama, N. Masuda, and T. Ito, "Rapid calculation of Fresnel computer-generated-hologram using look-up table and wavefront-recording plane methods for three-dimensional display," Optics Express 18(19), 19504-19509 (2010). Briefly described, for this conventional WRP method, the object wave on a virtual 2-D WRP that is close to the object scene is derived. For each object point in the object scene, only a small zone of diffraction fringe patterns is determined. Subsequently, the WRP is converted into a hologram. For a sparse object scene (e.g., a limited number of object points), a hologram can be generated at a relatively high frame rate. However, with regard to this conventional WRP method, the computation time will increase proportionally with the number of object points, hence restricting the generation of holograms to a small, or a coarsely sampled, object image.

Also, in the past, the display of digital holograms has been rather difficult due to the limited size and resolution of the display devices (e.g., spatial light modulator (SLM)). In recent years, such problems have been overcome to some degree with larger display devices of finer resolution, and also numerous means of expanding the viewing area through scanning mirrors and multiple SLMs. Although 3-D hologram display technology is becoming more and more mature and practical, the conventional methods for generating holograms can be too slow to attain real-time performance, especially for the increasing size of the hologram display area.

To that end, presented are techniques for fast (e.g., at video rate or faster in real-time or at least near real-time) processing of information to generate holograms (e.g., full parallax complex 3-D Fresnel holograms) that can represent an object scene (e.g., 3-D object scene), and displaying holographic images (e.g., full parallax complex 3-D Fresnel holographic images) representative of a 3-D object scene on a display device based at least in part on the holograms. The disclosed subject matter can generate full parallax holograms (e.g., full parallax complex 3-D Fresnel holograms) faster than conventional hologram generation techniques, and can be more computationally efficient than conventional hologram generation techniques. Also, the full parallax holograms generation using the techniques of the disclosed subject matter can have superior quality (e.g., superior visual quality) than holograms generated using conventional hologram generation techniques, wherein, for instance, the full parallax holograms generation using the techniques of the disclosed subject matter can have full depth and parallax information, and can have a resolution that can be the same as or substantially the same as the original visual images of the object scene. Due to the quickness of the generation of holograms using the techniques of the disclosed subject matter, relatively large holograms can be generated at well above video rate (e.g., well above 30 frames per second) from computer graphic models of 3-D object scenes, or from real 3-D object scenes that can be acquired with cameras (e.g., 3-D cameras, such as time-of-flight cameras).

A holographic generator component (HGC) can receive or generate visual images (e.g., 3-D visual images), comprising depth and parallax information, of a 3-D object scene (e.g., a real or synthetic 3-D object scene). The visual images can represent the 3-D object scene from a number of different visual perspectives (e.g., from a number of different viewing angles).

In accordance with various implementations, the HGC can comprise a hologram processor component that can apply a first non-uniform transform to a visual image representing the 3-D object scene to generate a first signal, wherein the applying of the first non-uniform transform to the visual image can involve a relatively small amount of computations (e.g., arithmetic operations). The hologram processor component can apply a second transform to the first signal to generate a second signal that can correspond to a hologram that represents the 3-D object scene, wherein the applying of the second transform to the first signal can involve a relatively small amount of computations (e.g., arithmetic operations). Since the hologram processor component can generate holograms by applying the first non-uniform transform to a visual image to produce a first signal and the second transform to the first signal to generate the hologram, and since such operations can involve a relatively small amount of computations, the hologram processor component can generate holograms at a speed (e.g., at a standard video rate (e.g., approximately 30 frames per second) or faster) that can be significantly higher than existing hologram generation techniques.

In some implementations, the hologram processor component can employ the hologram generation method, process, techniques, and algorithms that can be independent of the number of object points of the object scene to facilitate quickly generating a hologram of the object scene, wherein the hologram generation method, process, techniques, and algorithms can involve, for example a pair of re-sampling operations, and 4 Fast Fourier Transform (FFT) operations, as more fully disclosed herein. Also, the hologram generated by the hologram processor component using such hologram generation method, process, techniques, and algorithms can comprise or preserve the parallax information (e.g., full vertical and horizontal parallax information) and depth information of the original 3-D object scene (e.g., a dense 3-D object scene).

The holograms generated by the hologram processor component can be full parallax complex 3-D Fresnel holograms that can comprise full depth and parallax information (e.g., horizontal parallax information and vertical parallax information) of the 3-D object scene. The full parallax complex 3-D Fresnel holograms can represent the 3-D object scene from a number of different visual perspectives (e.g., from a number of different viewing angles), which can correspond to the viewing perspectives of the 3-D object scene as contained in the original visual images of the 3-D object scene.

The holograms can be illuminated with a coherent light beam to facilitate generating holographic images that can be reconstructed images that reconstruct the 3-D object scene, wherein the holograms and corresponding holographic images can be in color or black and white. Due to the relatively high computational efficiency of the disclosed subject matter, the techniques (e.g., applying of the non-uniform transform to the visual image to produce a signal, and applying a second transform to the signal to produce the hologram) employed by the hologram processor component can be directly applied in the generation of color holograms using hardware and/or computing devices (e.g., computers, mobile phones, electronic tablets or pads, electronic gaming devices).

A display component can be associated with (e.g., communicatively connected to) the HGC. The display component can comprise, for example, one or more display devices, can display the holographic images (e.g., reconstructed holographic images) for viewing (e.g., 3-D viewing) by observers, wherein the reconstructed holographic images can represent the 3-D object scene from a number of different visual perspectives (e.g., from a number of different viewing angles), which can correspond to the original visual images. In some implementations, a hologram also can be displayed using a static media (e.g., a single static media), such as a photographic film or a printout, comprising information relating to the hologram.

Turning to FIG. 1, illustrated is a block diagram of an example system 100 that can efficiently and quickly (e.g., in real time or at least near real time) generate a hologram(s) (e.g., a full-parallax 3-D complex Fresnel hologram(s)) of a real or synthetic 3-D object scene(s), and display 3-D holographic images, based at least in part on the hologram(s), on a display component, in accordance with various aspects and embodiments of the disclosed subject matter. In an aspect, the system 100 can include a holographic generator component (HGC) 102 that can desirably generate complex holograms that can represent a 3-D object scene (e.g., real or computer-synthesized 3-D object scene) from multiple different viewing perspectives that can correspond to multiple different viewing perspectives of the visual images and correspondingly the original 3-D object scene. A complex hologram (e.g., a complex amplitude hologram) is a hologram that can comprise a magnitude component or portion (e.g., an amplitude magnitude component or portion), which can have a magnitude value, and a phase component or portion, which can have a phase value. As more fully disclosed herein, the complex holograms can be used to generate, reconstruct, or reproduce 3-D holographic images for display to one or more viewers, wherein the 3-D holographic images can represent or recreate the original 3-D object scene from multiple visual perspectives.

In some embodiments, the HGC 102 and/or other components (e.g., display component 104) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 104. The HGC 102 and display component 104 (e.g., a SLM or LCoS display device) can facilitate generating and displaying holograms that can represent the object scene at video rate or faster in real time or near real time and displaying, for example, 2048×2048 pixel (or larger) holographic images (e.g., full-parallax 3-D holographic images), each of which can represent 4 million object points, at approximately 40 frames per second or faster in real time or near real time).

The HGC 102 can receive (e.g., obtain) visual images of a real 3-D object scene (e.g., captured 3-D object scene), or can generate or receive visual images of a synthetic 3-D object scene (e.g., computer generated 3-D object scene). In some implementations, the HGC 102 can generate or receive visual images of a computer generated 3-D object scene that can be realized (e.g., generated) using numerical means without the presence of a physical or real-world 3-D object scene.

The HGC 102 can comprise a hologram processor component 106 that can be employed to facilitate efficiently and quickly (e.g., at video rate or faster, in real or near real time) generating holograms that can represent the original 3-D object scene from various (e.g., different) visual perspectives (e.g., from a number of different viewing angles), which can correspond to the visual images of the original 3-D object scene, to facilitate displaying holographic images by the display component 104 based at least in part on the holograms. To facilitate efficiently, generating, converting, and displaying holograms of desirable quality, the hologram processor component 106 can quickly (e.g., at video rate or a faster rate, in real-time or at least near real-time) process information in connection with generating digital holograms that can represent the original 3-D object scene.

In accordance with various implementations, to facilitate generating a complex hologram of a 3-D object scene, the hologram processor component 106 can apply a first transform to a visual image representing the 3-D object scene to generate a first signal as an output. In some implementations, the first transform can be a non-uniform transform. The applying of the first transform to the visual image can involve a relatively small amount of computations (e.g., arithmetic operations). The hologram processor component 106 can apply a second transform to the first signal to generate a hologram (e.g., generate a second signal that can correspond to a hologram) that can represent the 3-D object scene. The applying of the second transform to the first signal also can involve a relatively small amount of computations (e.g., arithmetic operations). Since the hologram processor component 106 can generate holograms by applying the first transform to a visual image to produce a first signal and the second transform to the first signal to generate the hologram, and since such operations can involve a relatively small amount of computations, the hologram processor component 106 can be able to generate holograms at a speed (e.g., at a standard video rate (e.g., approximately 30 frames per second) or faster) that can be significantly higher than existing hologram generation techniques.

The holograms generated by the hologram processor component 106 can be full parallax complex 3-D Fresnel holograms that can comprise or preserve full depth information and full parallax information (e.g., horizontal parallax information and vertical parallax information) of the 3-D object scene. The full parallax complex 3-D Fresnel holograms can represent the 3-D object scene from a number of different visual perspectives (e.g., from a number of different viewing angles), which can correspond to the viewing perspectives of the 3-D object scene as contained in the original visual images of the 3-D object scene. The holograms (and corresponding holographic images) can be in color or in black and white. Due to the relatively high computational efficiency of the disclosed subject matter, the techniques (e.g., applying of the non-uniform transform to the visual image to produce a signal, and applying a second transform to the signal to produce the hologram) employed by the hologram processor component 106 can be directly applied in the generation of color holograms using hardware and/or computing devices (e.g., computers, mobile phones, electronic tablets or pads, electronic gaming devices).

In some implementations, the hologram processor component 106 can generate model data that can represent the 3-D object scene from a desired number of viewing perspectives, based at least in part on the visual images (e.g., the object points of the visual images) and/or received or generated information regarding the original 3-D object scene from multiple visual perspectives. The HGC 102 also can convert the model data to generate digital holographic data for the 3-D hologram that can be used to facilitate generating and displaying 3-D holographic images that can represent or recreate the original 3-D object scene from multiple visual perspectives.

The HGC 102 and/or display component 104 can facilitate generating a reconstructed holographic image(s) based at least in part on the hologram of the object scene. For instance, the HGC 102 and/or display component 104 can facilitate applying a coherent optical beam to the complex hologram to facilitate generating a reconstructed holographic image(s) that can represent the 3-D object scene associated with the complex hologram. As more fully disclosed in the disclosed subject matter, the reconstructed holographic images, generated based at least in part on the complex hologram, can have more favorable visual quality and can be generated more efficiently, as compared to reconstructed holographic images obtained from holograms generated using conventional hologram generation techniques.

With further regard to the display component 104, the display component 104 can be electronically accessible. The HGC 102 can be associated with (e.g., communicatively connected to) the display component 104 and can provide (e.g., communicate) the 3-D hologram (e.g., the 3-D complex hologram) to the display component 104, for example, at video rate or a faster rate in real or near real time. In some implementations, the 3-D complex hologram can be on recorded media (e.g., 2-D media, such as film), and the HGC 102 can provide the 3-D complex hologram via the recorded media, as disclosed herein.

The display component 104 can facilitate generating, reconstructing, reproducing, or presenting 3-D holographic images (e.g., full-parallax 3-D Fresnel holographic images, comprising or preserving 3-D depth information, and 3-D vertical and horizontal parallax information) that can represent or recreate the original 3-D object scene, based at least in part on the holograms, and can present (e.g., display) the 3-D holographic images for viewing by one or more viewers from various (e.g., different) visual perspectives (e.g., from a number of different viewing angles) of the original 3-D object scene, which can correspond to the various visual perspectives illustrated in the visual images of the original 3-D object scene. In some implementations, the HGC 102 and the display component 104 can operate in conjunction with each other to facilitate generating, reconstructing, reproducing, or presenting the 3-D holographic images that can represent or recreate the original 3-D object scene, based at least in part on the complex holograms, for presentation, by the display component 104. The display component 104 can be or can comprise one or more display devices, such as an SLM display device or an LCoS display device that can be used to facilitate displaying 3-D holographic images (e.g., full-parallax 3-D complex Fresnel holographic images) that can be reconstructed using the hologram.

For instance, the display component 104 can include one or more display units (e.g., one or more electronically accessible display units, wherein each pixel of a display unit(s) can be electronically accessible), wherein each display unit can be an SLM display device or an LCoS display device. In some implementations, the display component 104 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from holograms), to facilitate displaying (e.g., real time displaying) of holographic images.

Additionally and/or alternatively, if desired, a hologram can be produced (e.g., by the HGC 102 or another component) onto a desired material (e.g., onto film using photographic techniques) so that there can be a hard copy of the hologram that can be used to reproduce the 3-D holographic images at a desired time. In some implementations, the HGC 102 can generate the digital hologram (e.g., the 3-D complex hologram) using a single static media, such as a photographic film or a printout, comprising information relating to the digital hologram. The display component 104 can display holographic images that can be reconstructed based at least in part on the digital hologram contained on the static media.

It is to be appreciated and understood that the holographic output (e.g., 3-D hologram and/or corresponding 3-D holographic images) can be communicated over wired or wireless communication channels to the display component 104 or other display components (e.g., remote display components, such as a 3-D TV display) to facilitate generation (e.g., reconstruction, reproduction) and display of the 3-D holographic images of the 3-D object scene) so that the 3-D holographic images can be presented to desired observers.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, educational applications or purposes, a holographic studio, scientific research, live stage or concerts, etc.

The hologram processing and generation techniques employed by the HGC 102 (e.g., the hologram processor component 106 of the HGC 102) in accordance with the disclosed subject matter can have a number of advantages relative to conventional systems, methods, and techniques for hologram processing and generation. For instance, the holographic images generated from the holograms, using the HGC 102 and/or display component 104, in accordance with the disclosed subject matter, can exhibit favorable visual quality, as compared with holographic images obtained using conventional holographic generation techniques. The holograms and corresponding holographic images generated using the HGC 102 and/or display component 104 can comprise or preserve full parallax information (e.g., horizontal and vertical parallax information) and depth information of the object scene, whereas conventional holographic generation techniques typically can lack or sacrifice some or all of the parallax information or depth information of the object scene. The holograms and corresponding holographic images generated using the HGC 102 and/or display component 104 can have or represent a longer or larger depth range in the 3-D object scene (e.g., longer distance between the nearest and farthest point in the 3-D object scene) than conventional holograms and holographic images generated using existing hologram generation techniques, which typically generate holograms that have a decreased depth range in order to speed up the hologram generation process.

Further, the holograms and corresponding holographic images generated using the HGC 102 and/or display component 104 can have a resolution that can be the same as or substantially the same as the object scene or source visual images of the object scene. This is due in part to the hologram processor component not having to downsample the visual images of the object scene, and not having to apply interpolation to rebuild visual information that would be removed if the visual images had been downsampled. Various conventional holographic generation techniques typically can employ downsampling of the source visual images to reduce computation time in generating the holograms, and the downsampling can degrade the resolution and other aspects of quality of the reconstructed holographic images created from the downsampled images, since fewer object points are involved in the computation. Furthermore, using the techniques of the disclosed subject matter, it is not necessary for the HGC 102 to pre-process the source 3-D object scene into projected images or polygonal wireframe models like some existing methods do.

Further aspects and embodiments of the disclosed subject matter are described herein with regard to FIG. 1 and the other figures disclosed herein. The hologram processor component 106 can employ fast methods or techniques for generating holograms (e.g., 2048×2048-pixel digital 3-D Fresnel holograms) at a rate of over 100 frames per second. The hologram processor component 106 can sample (e.g., non-uniformally sample) an object wave of an image of an object scene and generate the object wave or image on a wavefront recording plane (WRP) that can be close to the object scene. The hologram processor component 106 can modulate the sampling interval at each point on the WRP image according to a depth map. The hologram processor component 106 can convert the WRP image into a hologram. The hologram generated by the hologram processor component 106 can be referred to as a warped WRP (WWRP) hologram and can be capable of presenting (e.g., holographically presenting) a 3-D object of a 3-D object scene with faster speed as compared with existing systems, methods, and techniques.

The method, process, and techniques employed by the hologram processor component 106 for generating WWRP holograms can comprise 4 stages, and the following terminologies are adopted in connection with the disclosed method, process, and techniques. The source 3-D object can be modeled (e.g., by the hologram processor component 106) as a 3-D surface, with the intensity of each object point represented by the planar images $I(x,y)$ and the depth of each object point represented by the depth map $D(x,y)$. The hologram can be denoted by $H(x,y)$ and the WRP can be denoted by $W(x,y)$. It can be assumed that $I(x,y)$, $D(x,y)$, $W(x,y)$, and $H(x,y)$ are identical in size, comprising of X columns and Y rows of pixels. Each pixel can have a dimension of $\delta \times \delta$.

Stage 1 of the multi-stage process can involve re-sampling (e.g., pre-warping) the object intensity image by the hologram processor component 106. Since $I(x,y)$, $D(x,y)$, $W(x,y)$, and $H(x,y)$ are digital images, the default sampling interval can be uniform for both the horizontal and the vertical directions. In this $1^{st}$ stage, the hologram processor component 106 can obtain a new image $I_1$ (x,y), which can be referred to as the pre-warped image, by sampling pixels from the original image of the object scene according to the depth map. In other words, the sampling interval of the pre-warped image employed by the hologram processor component 106 can be non-uniform. The rationale, as well as the criteria of pixel mapping between I(x,y) and $I_1$ (x,y) will be more fully disclosed and explained herein. At this point, $I_1$ (x,y) can be interpreted to be a modified version of the original image.

Stage 2 of the multi-stage process can involve generation of the WRP for an image by the hologram processor component 106. In the 2nd stage, the hologram processor component 106 can generate a WRP associated with (e.g., representing) the image from the pre-warped image $I_1$ (x,y). The WRP can be a hypothetical plane that can be placed at a close distance $z_0$ from, and parallel to, $I_1$(x,y), (e.g., by the hologram processor component 106) wherein $$W(x,y)=I_1(x,y)*h(x,y;z_o). \quad (1)$$

Assuming $z_o \gg \delta$, which generally can be true in practice, the free-space impulse response $h(x,y;z_o)$ can be approximated as $$h(x,y;z_o)=\exp[i\pi(x^2\delta^2+y^2\delta^2)/(\lambda z_o)]. \quad (2)$$

Stage 3 of the multi-stage process can involve re-sampling (e.g., warping) the WRP by the hologram processor component 106. In this 3rd stage, the hologram processor component 106 can incorporate the depth map D(x,y) onto the WRP in accordance with the method and techniques of the disclosed subject matter. It is noted that, due to the close proximity between the WRP and the object image, each object point of the object image generally is only affecting a small neighboring region on the WRP. It can further be assumed that the depth map is generally smooth, so that within a small neighborhood of an object point, the depth value can be practically constant. The depth of each object point within the region can be extended by changing the sampling interval (e.g., via the hologram processor component 106) at the corresponding region on the WRP. To illustrate this, a simple scenario of a small region R centered at $(x_o, y_o)$ on the WRP can be considered. The diffraction fringe pattern in R can be mainly contributed by object points that can be close to the region, with almost the same depth. Object points that are farther away can have less effect, and can be neglected (e.g., by the hologram processor component 106). Supposing the sampling interval in R is increased by a factor α, both the WRP and its corresponding image $I_1$(x,y) can be scaled by the same amount (e.g., same factor α). The hologram processor component 106 can determine (e.g., calculate) the modified WRP signal associated with (e.g., representing) the image using Equation (3) as follows, for example, $$W(x,y)|_{x,y \in R}=W(x',y')=I_1(x',y')*h(x',y';z_o), \quad (3)$$

wherein a≤1, x'=x/a, and y'=y/a. The hologram processor component 106 can determine or express the last term h(x', y';$z_o$) in Equation (2) as follows, for example, $$h(x', y'; z_o) = \exp\left[\frac{i2\pi}{\lambda}\frac{(x'^2\delta^2 + y'^2\delta^2)}{2z_o}\right] = \exp\left[\frac{i2\pi}{\lambda}\frac{(x^2\delta^2 + y^2\delta^2)}{2a^2 z_o}\right] = h(x, y; a^2 z_o). \quad (4)$$

Equation (3) can be rewritten as Equation (5), and the hologram processor component 106 can determine the modified WRP signal associated with (e.g., representing) the image using Equation (5), as follows, for example, $$W(x,y)|_{x,y \in R}=I_1(x/a,y/a)*h(x,y;a^2 z_o). \quad (5)$$

Equation (5) can indicate that due to the stretching of the sampling interval, the effective depth of the object points corresponding to the diffraction patterns in the region R has been relocated to a new value $a^2 z_o$. At the same time, the original source image I(x,y), has been changed to $I_1$ (x', y'). However, it can be easily seen that the original image can be preserved if $I_1$ (x', y') is set to I(x,y) in Equation (5). This is the principle on deriving the pre-warped image in Stage 1. Referring back to Equation (5), if the depth of the object scene covered by the region R is to be increased from $z_o$ to $(z_o+D(x_o, y_o))$, the sampling interval in R is to be increased by a factor α (e.g., by the hologram processor component 106), in accordance with Equation (6), for example, so that $$a^2 z_o = z_o + D(x_o, y_o) \Rightarrow a = \sqrt{1+D(x_o,y_o)/z_o}, \quad (6)$$

which can be equivalent to changing the standard uniform sampling interval to a new value b which depends on the depth map D as given by $$b=1/a=1/\sqrt{1+D(x_o,y_o)/z_o}. \quad (7)$$

Generalizing the above principle to the entire WRP, the hologram processor component 106 can determine (e.g., calculate, derive) a revised matrix of sampling intervals (e.g., comprising respective values of $S_1$) for each pixel location associated with the image, taking into account the corresponding depth value, using Equation (8), for example, as follows $$S_1(x,y)=1/\sqrt{1+D(x,y)/z_o}. \quad (8)$$

Figure 2:
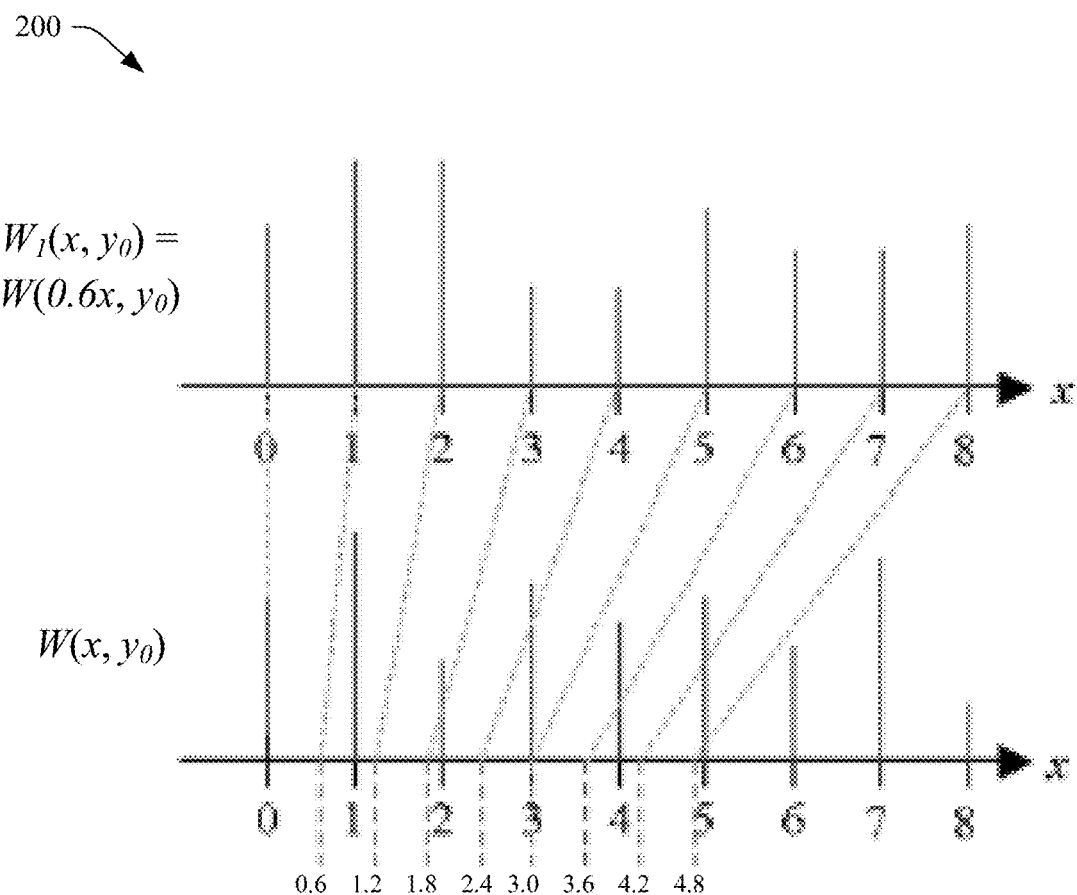
FIG. 2 presents a diagram of an example mapping illustrating the formation of pixels associated with an image, in accordance with aspects and implementations of the disclosed subject matter.

After all the elements in $S_1$(x,y) are determined by the hologram processor component 106, the hologram processor component 106 can determine (e.g., calculate) and/or generate a new image $W_1$(x,y), which can be referred to as the warped WRP, by re-locating each pixel associated with the image into its new position according to the revised sampling intervals. This can be described with, and the hologram processor component 106 can apply, a point mapping operation, in accordance with Equation (9), for example, as follows $$W_1(x, y) = W(p_{x;y}, q_{x;y}), \quad (9)$$

wherein $$p_{x;y} = Rn\left[\sum_{m=1}^{x} S_1(m, y)\right] = Rn[p_{x-1;y} + S_1(x, y)], \text{ and} \quad (10)$$

$$q_{x;y} = Rn\left[\sum_{n=1}^{y} S_1(x, n)\right] = Rn[p_{x;y-1} + S_1(x, y)], \quad (11)$$

wherein Rn[A] is the "round" operation that returns the nearest integer of a real number A (for example, Rn[1.2]=1 and Rn[1.8]=2). Referring briefly to FIG. 2 (along with FIG. 1), FIG. 2 presents a diagram of an example mapping 200 illustrating the formation of pixels associated with an image, in accordance with aspects and implementations of the disclosed subject matter. The example mapping 200 can illustrate the formation of some pixels along a single row of pixels at y=$y_0$ of $W_1$(x,y) in FIG. 2, based on a uniform sampling interval of, for example, 0.6 (e.g., $S_1$ (x,$y_0$)=0.6). The same principle can be extended to 2-D sampling with non-uniform sampling intervals (e.g., by the hologram processor component 106). From the mapping 200 in FIG. 2, it can be seen that each sample in $W_1(x,y_o)$ can be mapped from one of the samples in $W(x,y)$ (e.g., by the hologram processor component 106), wherein $W_1(x,y_o)=W(0.6x,y)$.

For instance, as shown in the mapping 200, the hologram processor component 106 can apply the rounding function Rn[A] to round the real number value of 0.6 for x=1 to an integer value of 1 (e.g., 0.6 can be mapped to Rn[0.6]=1), to round the real number value of 1.2 for x=2 to an integer value of 1 (e.g., 1.2 can be mapped to Rn[1.2]=1), to round the real number value of 1.8 for x=3 to an integer value of 2 (e.g., 1.8 can be mapped to Rn[1.8]=2), etc., as more fully shown in the mapping 200 in FIG. 2.

As shown from, and by applying, Equation (9), the hologram processor component 106 can incorporate the depth information D(x,y) in the WRP image $W_1(x,y)$. However, the WRP $W_1(x,y)$ can be contributed from the pre-warp image $I_1(p_{x,y},q_{x,y})$ instead of I(x,y). To preserve the original image, the hologram processor component 106 can generate the pre-warp image using Equation (12), for example, as follows $$I_1(p_{x,y},q_{x,y})=I(x,y). \quad (12)$$

Stage 4 of the multi-stage process can involve the hologram processor component 106 converting the WRP to a hologram. In the fourth (e.g., final) stage of the multi-stage process, the hologram processor component 106 can convert the WRP into a hologram H(x,y) that can be positioned at a distance of $z_h$ from the WRP. To facilitate accomplishing this, the hologram processor component 106 can convolve the warped WRP image $W_1(x,y)$ with the free-space impulse response $h(x,y;z_h)$, for example, using Equation (13) as given by $$H(x,y)=W_1(x,y)*h(x,y;z_h). \quad (13)$$

To speed up the calculation, the hologram processor component 106 can realize the convolution in Equations (1) and (13) in the spectral domain based at least in part on a pair of Fast Fourier Transform (FFT) operations, for example, using Equations (14) and (15), as follows $$W(x,y)=I_1(x,y)*h(x,y;z_o)=IFFT[FFT[I_1(x,y)]FFT[h(x,y;z_o)]], \quad (14)$$

and $$H(x,y)=W_1(x,y)*h(x,y;z_h)=IFFT[FFT[W_1(x,y)]FFT[h(x,y;z_h)]], \quad (15)$$

wherein FFT ["function(s) to be transformed"] denotes the forward FFT operation and IFFT ["function(s) to be inversely transformed"] denotes the inverse FFT operation. An evaluation of the computation loading involves in the disclosed hologram generation method is given in Table 1, and the evaluation can be explained as follows. As the FFT of the free-space impulse response functions can be pre-computed in advance (e.g., by the hologram processor component 106 or another component), the hologram processor component 106 can realize Equations (14) and (15) by performing 4 FFT operations. Next, in Equation (8), the hologram processor component 106 (or another component) can determine or deduce the sampling array $S_1(x,y)$ from D(x,y) with a look-up table (LUT) with a negligible amount of computation. The location of the new sample positions $(p_{x,y},q_{x,y})$ only involves 2 additions per pixel of the image, in accordance with Equations (10) and (11). However, it can be seen that, in the computation of $p_{x,y}$ and $q_{x,y}$ the hologram processor component 106 can evaluate each column and row, indexed with 'y' and 'x', respectively, independently from each other. As such, the hologram processor component 106 can realize both of these processes (e.g., computations of $p_{x,y}$ and $q_{x,y}$) in a parallel fashion, and the hologram processor component 106 can perform (e.g., calculate, compute) the processes in Table 1 in less than 5 ms using a graphical processing unit (GPU). The re-sampling process performed by the hologram processor component 106, using, for example, Equations (9) and (12)) can be a memory-addressing operation and essentially can be computation free (e.g., can involve negligible or no computation) in practice. In the above evaluation, there can be some extra time involved for transferring the image data to and from the computing device and the source/destination units. However, these additional overheads are not directly related to the disclosed method and hence are not included as a part of the computation loading.

TABLE 1

Evaluation of computation loading of disclosed hologram generation method

| Generation of WRP using Equation (14) | Converting the WRP to hologram using Equation (15) | Computing $s_1(x, y)$ using Equation (8) | Computing $p_{x,y}$ and $q_{x,y}$ using Equations (10) and (11) |
|---|---|---|---|
| 2 FFT operations | 2 FFT operations | Use look-up table (LUT) | 2 addition operations per pixel |

Figure 3:
FIG. 3 presents an example intensity image of model 'A', in accordance with aspects of the disclosed subject matter.
Figure 4:
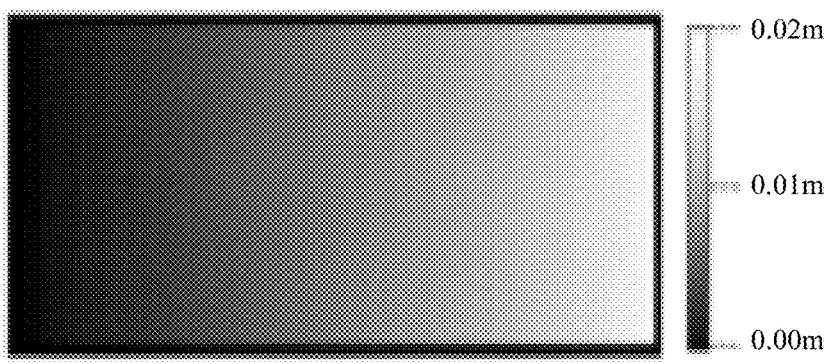
FIG. 4 presents an example depth map of model 'A', in accordance with aspects of the disclosed subject matter.
Figure 5:
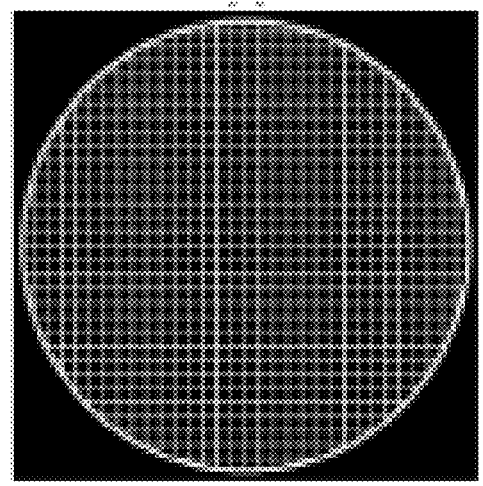
FIG. 5 presents an example intensity image of model 'B', in accordance with aspects of the disclosed subject matter.
Figure 6:
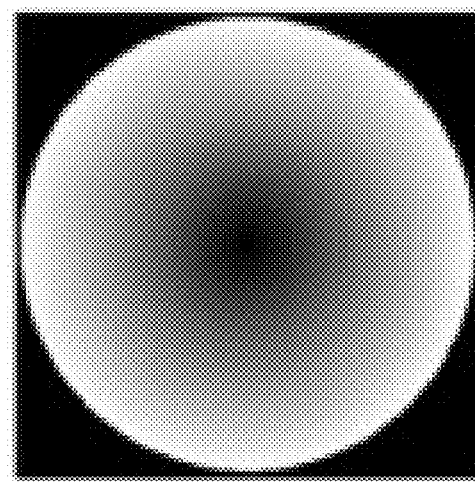
FIG. 6 presents an example depth map of model 'B', in accordance with aspects of the disclosed subject matter.

Experiments were performed using the disclosed method, wherein the disclosed method was evaluated with a pair of 3-D models. Referring to FIGS. 3, 4, 5, and 6 (along with FIG. 1), each model was represented by the intensity image and the depth map as shown in FIGS. 3, 4, 5, and 6. FIG. 3 presents an example intensity image 300 of model 'A', FIG. 4 presents an example depth map 400 of model 'A', FIG. 5 presents an example intensity image 500 of model 'B', and FIG. 6 presents an example depth map 600 of model 'B', in accordance with aspects of the disclosed subject matter. The depth map (e.g., depth map 400, depth map 600) shows the relative distance, with the nearest and the farthest distances from the viewpoint represented in black and white intensity, respectively. The first model 'A' is a wedge geometry (progressively increasing depth from left to right) with a highly textural image, while the second model 'B' is a cone having the texture of the grid image, and with the tip of the cone being nearest to the hologram. The depth range of model 'A' and model 'B' are each [0,0.02 m].

The size of the object image (e.g., intensity image 300, intensity image 500), the WRP, and the hologram are assumed to be identical and composing of 2048×2048 pixels. The wavelength of the optical beam was set to 650 nm, the pixel size δ of the hologram was set to 7 um, and the distance between the WRP I(x,y) (e.g., $z_o$) was set to 0.1 m. For each of model 'A' and model 'B', the following operations were conducted. First, Equation (8) is first applied (e.g., using the hologram processor component 106) to determine and generate the sampling interval matrix $S_1$ (x,y), based on the respective depth map (e.g., depth map 400, depth map 600) in each case. After $S_1(x,y)$ is determined, Equations (10) and (11) were applied (e.g., using the hologram processor component 106) to generate the revised sampling intervals with respect to each model, wherein the revised sampling intervals were taken to derive the pre-warped image $I_1(x,y)$ with respect to each model. With respect to each model, Equation (14) was applied (e.g., using the hologram processor component 106) to convert $I_1(x,y)$ into the WRP image $W(x,y)$, from which a warped WRP $W_1(x,y)$ was generated using Equation (9) (e.g., using the hologram processor component 106). Subsequently, with respect to each model, Equation (15) was applied (e.g., using the hologram processor component 106) to convert the warped WRP in the hologram $H(x,y)$ that was separated by a distance of $z_h=0.3$ m from the WRP.

Figure 7:
FIG. 7 presents an example reconstructed image of a warped wavefront recording plane (WWRP) hologram of the wedge model 'A' at the focused distance of 0.4 m from the hologram, in accordance with aspects of the disclosed subject matter.
Figure 8:
FIG. 8 presents an example reconstructed image of a WWRP hologram of the wedge model 'A' at the focused distance of 0.41 m from the hologram, in accordance with aspects of the disclosed subject matter.
Figure 9:
FIG. 9 presents an example reconstructed image of a WWRP hologram of the wedge model 'A' at the focused distance of 0.42 m from the hologram, in accordance with aspects of the disclosed subject matter.
Figure 10:
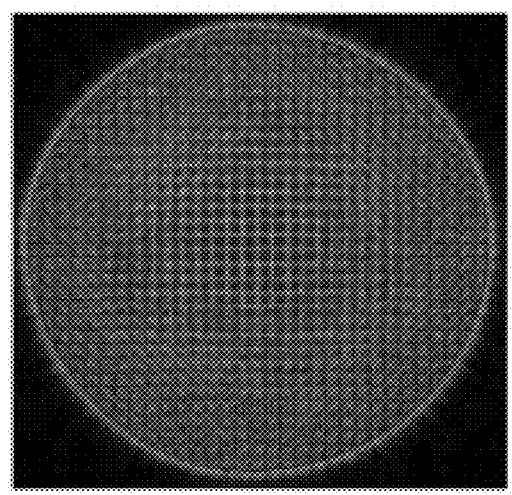
FIG. 10 presents an example reconstructed image of the WWRP hologram of the wedge model 'B' at the focused distance of 0.4 m from the hologram, in accordance with aspects of the disclosed subject matter.
Figure 11:
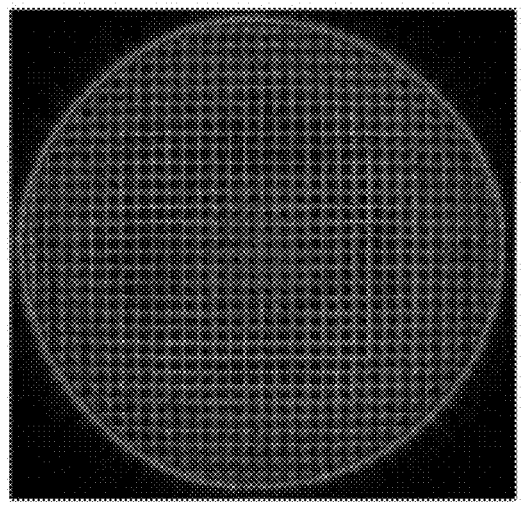
FIG. 11 presents an example reconstructed image 1100 of the WWRP hologram of the wedge model 'B' at the focused distance of 0.41 m from the hologram, in accordance with aspects of the disclosed subject matter.
Figure 12:
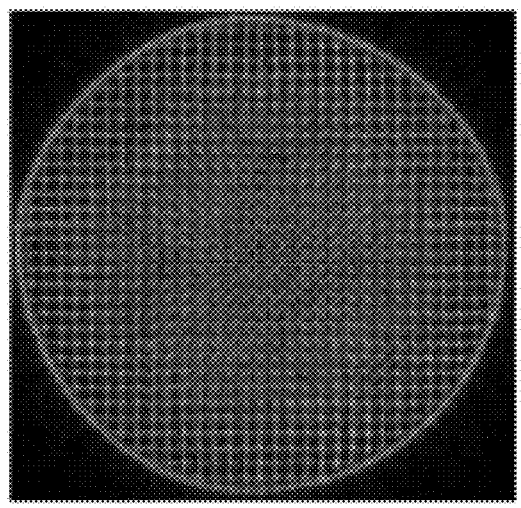
FIG. 12 presents an example reconstructed image 1200 of the WWRP hologram of the wedge model 'B' at the focused distance of 0.42 m from the hologram, in accordance with aspects of the disclosed subject matter.

To evaluate the holograms generated by the disclosed method, the numerical reconstructed images have been computed at 3 selected focused planes positioned at 0.1 m, 0.11 m, and 0.12 m from the WRP (e.g., $z_h+0.1$ m=0.4 m, $z_h+0.11$ m=0.41 m, and $z_h+0.12$ m=0.42 m). The results are shown in FIGS. 7, 8, 9, 10, 11, and 12. FIG. 7 presents an example reconstructed image 700 of the WWRP hologram of the wedge model 'A' at the focused distance of 0.4 m from the hologram, FIG. 8 presents an example reconstructed image 800 of the WWRP hologram of the wedge model 'A' at the focused distance of 0.41 m from the hologram, and FIG. 9 presents an example reconstructed image 900 of the WWRP hologram of the wedge model 'A' at the focused distance of 0.42 m from the hologram, in accordance with aspects of the disclosed subject matter. FIG. 10 presents an example reconstructed image 1000 of the WWRP hologram of the wedge model 'B' at the focused distance of 0.4 m from the hologram, FIG. 11 presents an example reconstructed image 1100 of the WWRP hologram of the wedge model 'B' at the focused distance of 0.41 m from the hologram, and FIG. 12 presents an example reconstructed image 1200 of the WWRP hologram of the wedge model 'B' at the focused distance of 0.42 m from the hologram, in accordance with aspects of the disclosed subject matter.

For model 'A', it can be observed that, when the focused plane is at 0.4 m, the textural patterns on the left side of the reconstructed image 700 in FIG. 7 (that is closer to the hologram) are clearer than the rest of the reconstructed image. As can be seen in the reconstructed image 800 in FIG. 8, when the focused plane is at 0.41 m, the clearer region moves to the middle of the reconstructed image 800, and, as can be seen in the reconstructed image 900 in FIG. 9, when the focused plane is at 0.42 m, the clearer region moves to the right side of the reconstructed image 900.

Similar results were obtained for model 'B', as shown in reconstructed image 1000, reconstructed image 1100, and reconstructed image 1200, respectively. In FIG. 10, the part of the grid pattern of the reconstructed image 1000 that is closest to the hologram is more clearly reconstructed at 0.4 m, relative to other parts of the reconstructed image 1000, whereas, in FIG. 11, the middle section of the cone of the reconstructed image 1100 is clearer at the reconstruction distance of 0.41 m relative to the other parts of the reconstructed image 1100, while, in FIG. 12, when the focused plane is at 0.42 m, the bottom section of the cone of the reconstructed image 1200 is reconstructed with more clarity relative to the other parts of the reconstructed image 1200. The above observations can become even more apparent when the images are zoomed in. These evaluations show that the hologram generated by the disclosed method (e.g., using the hologram processor component 106) can be capable of preserving the depth information, as well as the intensity, of the source object.

The disclosed subject matter provides for a fast method, process, and techniques for generation of holograms (e.g., full parallax 3-D complex Fresnel holograms) that only involve 2 re-sampling processes and 4 FFT operations. Compared with existing hologram generation methods that are based on the WRP framework, method, process, and techniques for generation of holograms of the disclosed subject matter can have the following advantages over conventional hologram generation methods. First, with regard to the disclosed subject matter, the hologram processor component 106 can generate the initial WRP directly from a planar image of the object scene instead of from individual object points of the image of the object scene, in contrast with certain conventional hologram generation methods. As such, the process of the disclosed subject matter can be realized swiftly by the hologram processor component 106 by performing a pair of FFT operations, and the computation time can independent on the number of object points of the image. Second, the hologram processor component 106 can incorporate the depth information at each point of the object scene into the initial WRP by adjusting the local sampling intervals. The amount of arithmetic calculations involved can be insignificant in the re-sampling process, as compared with the computation of the WRP fringe patterns for individual object points, as is done with certain conventional hologram generation methods. Third, there is no need to reserve a large look-up-table to store the pre-computed WRP fringe patterns, in contrast to the relatively larger look-up tables that employed when using certain conventional hologram generation methods. Fourth, the hologram generated by the hologram processor component 106 can be capable of representing a dense object scene (e.g., dense 3-D object scene) without the need of down-sampling the intensity image of the object scene, hence preserving favorable visual quality on the reconstructed images (representing the object scene) that contain high textural contents, whereas, in contrast, certain conventional hologram generation methods downsample the intensity image of the object scene when generating the hologram, which can degrade the visual quality of the reconstructed images.

Experimentation and evaluation of the disclosed subject matter has demonstrated a 2048×2048 hologram, representing an image scene of similar size and comprising of complicated textures, can be generated (e.g., by the hologram processor component 106) in less than 10 ms (e.g., at a rate of over 100 frames per second). It is noted that the re-sampling process in Equation (12) may impose certain degradation in the source image, but as shown in the experimental results, the effect is not prominent for a depth range of 0.02 m. For a wider depth range, which can involve a higher degree of re-sampling, the degradation may become progressively more obvious. As compared with the conventional hologram generation method provided in T. Shimobaba, H. Nakayama, N. Masuda, and T. Ito, "Rapid calculation of Fresnel computer-generated-hologram using look-up table and wavefront-recording plane methods for three-dimensional display," Optics Express 18(19), 19504-19509 (2010), the speed performance of disclosed hologram generation method is about the same in the generation of a hologram for $3\times10^4$ object points (based on the GPU employed in the disclosed subject matter), and the image quality is also similar, as that conventional hologram generation method. However, with regard to that conventional hologram generation method, as the number of object points increased, the number of parallel threads can be insufficient to handle concurrent processing of all the object points due to the limited amount of parallel processors in the GPU. As a result, the hologram generation task has to be conducted sequentially in multiple rounds, hence lowering the overall computation speed for generation of the hologram. In contrast, in the hologram generation method of the disclosed subject matter, the speed can be fixed for a given hologram size and can be independent of the number of object points of the image of the object scene.

Figure 13:
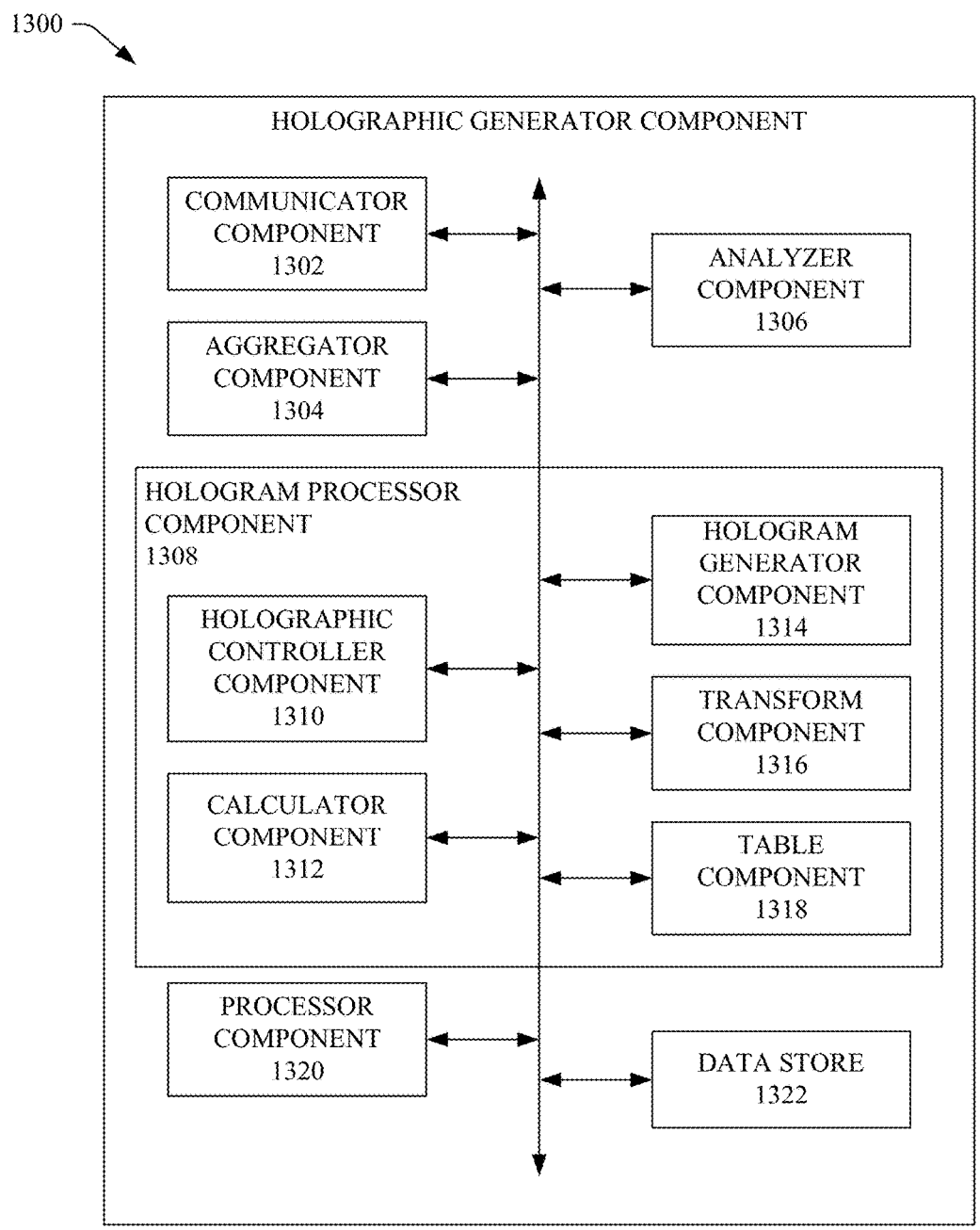
FIG. 13 illustrates a block diagram of an example holographic generator component that can efficiently generate a hologram(s) (e.g., a full-parallax 3-D complex Fresnel hologram(s)) that can represent a real or synthetic 3-D object scene(s), in accordance with various aspects and implementations of the disclosed subject matter.

FIG. 13 illustrates a block diagram of an example HGC 1300 that can efficiently generate (e.g., at video rate or faster, in real or at least near real time) a 3-D hologram(s) (e.g., a full-parallax 3-D complex Fresnel hologram(s)) that can represent a real or synthetic 3-D object scene(s), in accordance with various aspects and implementations of the disclosed subject matter. The HGC 1300 can include a communicator component 1302 that can be used to communicate (e.g., transmit, receive) information between the HGC 1300 and other components (e.g., display component(s), scene capture device(s), processor component(s), user interface(s), data store(s), etc.). The information can include, for example, information (e.g., visual information, including depth information, and vertical and horizontal parallax information) relating to a real or synthetic 3-D object scene, holograms or holographic images, information relating to a defined hologram generation criterion(s), information relation to an algorithm(s) (e.g., hologram generation algorithm) that can facilitate generation of holograms or holographic images, etc.

The HGC 1300 can comprise an aggregator component 1304 that can aggregate data received (e.g., obtained) from various entities (e.g., scene capture device(s), display component(s), processor component(s), user interface(s), data store(s), etc.). The aggregator component 1304 can correlate respective items of data based at least in part on type of data, source of the data, time or date the data was generated or received, object point with which data is associated, image with which data is associated, visual perspective of the object scene with which data is associated, etc., to facilitate processing of the data (e.g., analyzing of the data by the analyzer component 1306).

The analyzer component 1306 can analyze data to facilitate capturing or generating visual information (e.g., visual images, depth information, horizontal and parallax information) of an object scene, applying a first transform (e.g., a non-uniform transform) to a visual image of an object scene to generate a first signal and applying a second transform to the first signal to generate a complex hologram, and/or identifying elements (e.g., object points, features, etc.) of an object scene in a visual image to facilitate generating a hologram, etc., and can generate analysis results, based at least in part on the data analysis. Based at least in part on the results of this analysis, the HGC 1300 (e.g., using the hologram processor component 1308) can capture or generate visual information (e.g., visual images, depth information, horizontal and parallax information) of an object scene, apply a first transform to a visual image of an object scene to generate a first signal and apply a second transform to the first signal to generate a complex hologram, identify elements of an object scene in a visual image to facilitate generating a hologram, and/or perform other processes on data relating to holograms.

The HGC 1300 can include the hologram processor component 1308 that can process visual images (e.g., visual information of visual images) of an object scene to generate holograms. In accordance with various aspects and embodiments, based at least in part on the analysis results, the hologram processor component 1308 can apply a first transform to a visual image of an object scene to generate a first signal and apply a second transform to the first signal to generate a complex hologram, identify elements of an object scene in a visual image to facilitate generating a hologram, and/or perform other processes on data relating to holograms. In some implementations, the hologram processor component 1308 can comprise, for example, a holographic controller component 1310, a calculator component 1312, a hologram generator component 1314, a transform component 1316, and a table component 1318.

The holographic controller component 1310 can control operations relating to processing visual images to generate complex holograms (e.g., a full-parallax complex 3-D Fresnel holograms) based at least in part on the visual images of an object scene, and/or generating corresponding reconstructed holographic images based at least in part on the complex holograms. The holographic controller component 1310 can facilitate controlling operations being performed by various components of the hologram processor component 1308, controlling data flow between various components of the hologram processor component 1308, controlling data flow between the hologram processor component 1308 and other components of the HGC 1300, etc.

The calculator component 1312 can perform calculations on data (e.g., data with respective values), in accordance with various equations (e.g., mathematical expressions), such as, for example, the equations disclosed herein, to facilitate generating a WRP associated with a visual image, converting the WRP to a hologram, determining a sampling array ($S_1(x,y)$), determining new sample positions (e.g., $p_{x;y}, q_{x;y}$) for each pixel associated with a visual image, applying a first transform (e.g., non-uniform transform) to a visual image (e.g., visual information of a visual image) to generate a first signal and applying a second transform to the first signal to generate a complex hologram, etc. The calculator component 1312 can facilitate calculating, for example, results for one or more equations relating to the first transform, the second transform, or other operations associated with processing or generating holograms.

The hologram generator component 1314 can facilitate generating complex holograms that can represent an object scene from various perspectives, based at least in part on visual images that can represent the object scene from various perspectives, at a desired rate (e.g., at video rate (e.g., approximately 30 frames per second) or a faster video rate), for example, using one or more of the hologram generation techniques, processes, algorithms, or methods, as disclosed herein. The hologram generator component 1314 also can operate in conjunction with or coordinate with the transform component 1316 to facilitate applying the first transform (e.g., a non-uniform transform or another transform) to a visual image of an object scene to produce a first signal as an output, applying a second transform to the first signal to produce a complex hologram that can represent the object scene, or applying another transform(s) to the visual image or the first signal to facilitate generating a complex hologram that can represent the object scene. For instance, the hologram generator component 1314, operating in conjunction with or coordinating with the transform component 1316, can perform FFT and IFFT operations on respective functions and data (e.g., using Equations (14) and (15)) to facilitate speeding up the hologram generation process, as more fully disclosed herein. The complex holograms generated by the hologram generator component 1314 can comprise or preserve full parallax information (e.g., vertical parallax information and horizontal parallax information) and full depth information of the 3-D object scene and associated visual images.

The hologram generator component 1314 also can use the table component 1318 to facilitate speeding up the hologram generation process and reducing the number of computations that have to be performed to generate a hologram based on a visual image. The table component 1318 can comprise one or more tables (e.g., LUTs) that can comprise data (e.g., pre-computed data) relating the sampling array ($S_1(x,y)$) and depth map ($D(x,y)$). With regard to generating a hologram from a visual image, the hologram generator component 1314 can reference or look-up data in the one or more tables of the table component 1318 to facilitate determining or deducing the sampling array from the depth map.

The HGC 1300 also can comprise a processor component 1320 that can operate in conjunction with the other components (e.g., communicator component 1302, aggregator component 1304, analyzer component 1306, hologram processor component 1308, etc.) to facilitate performing the various functions of the HGC 1300. The processor component 1320 can employ one or more processors (e.g., central processing unit (CPU), GPU, a field programmable gate array (FPGA), etc.), microprocessors, or controllers that can process data, such as information (e.g., visual information) relating to an object scene (e.g., 3-D object scene), model data, holographic data, data relating to parameters associated with the HGC 1300 and associated components, etc., to facilitate applying transforms to data and functions, generating a WRP associated with a visual image, converting a WRP to a hologram, determining a sampling array, determining new sample positions for each pixel associated with a visual image, generating holographic images representative of a 3-D object scene based in part on a hologram representing the 3-D object scene, or performing other operations relating to generating holograms; and can control data flow between the HGC 1300 and other components associated with the HGC 1300.

In yet another aspect, the HGC 1300 can contain a data store 1322 that can store data structures (e.g., user data, metadata); code structure(s) (e.g., modules, objects, classes, procedures), commands, or instructions; information relating to object points; information relating to (e.g., representative of) an object scene; model data; holographic data; transforms (e.g., transform data or equations); information relating to applying transforms to data and functions to generate a hologram, generating a WRP associated with a visual image, converting a WRP to a hologram, determining a sampling array, determining new sample positions for each pixel associated with a visual image, generating holographic images representative of a 3-D object scene based in part on a hologram representing the 3-D object scene, or performing other operations relating to generating holograms, etc.; parameter data; algorithms (e.g., algorithm(s) relating to fast generation of holograms at a desired rate (e.g., at video rate or faster); defined hologram generation criterion(s); and so on. In an aspect, the processor component 1320 can be functionally coupled (e.g., through a memory bus) to the data store 1322 in order to store and retrieve information desired to operate and/or confer functionality, at least in part, to the communicator component 1302, aggregator component 1304, analyzer component 1306, hologram processor component 1308, etc., and/or substantially any other operational aspects of the HGC 1300. It is to be appreciated and understood that the various components of the HGC 1300 can communicate information between each other and/or between other components associated with the HGC 1300 as desired to carry out operations of the HGC 1300. It is to be further appreciated and understood that respective components (e.g., communicator component 1302, aggregator component 1304, analyzer component 1306, hologram processor component 1308, etc.) of the HGC 1300 each can be a stand-alone unit, can be included within the HGC 1300 (as depicted), can be incorporated within another component of the HGC 1300 (e.g., hologram processor component 1308) or a component separate from the HGC 1300, and/or virtually any suitable combination thereof, as desired.

It is to be appreciated and understood that, in accordance with various other aspects and embodiments, the HGC 1300 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam (e.g., a coherent light beam) to a 3-D hologram that represents a 3-D object scene), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 14:
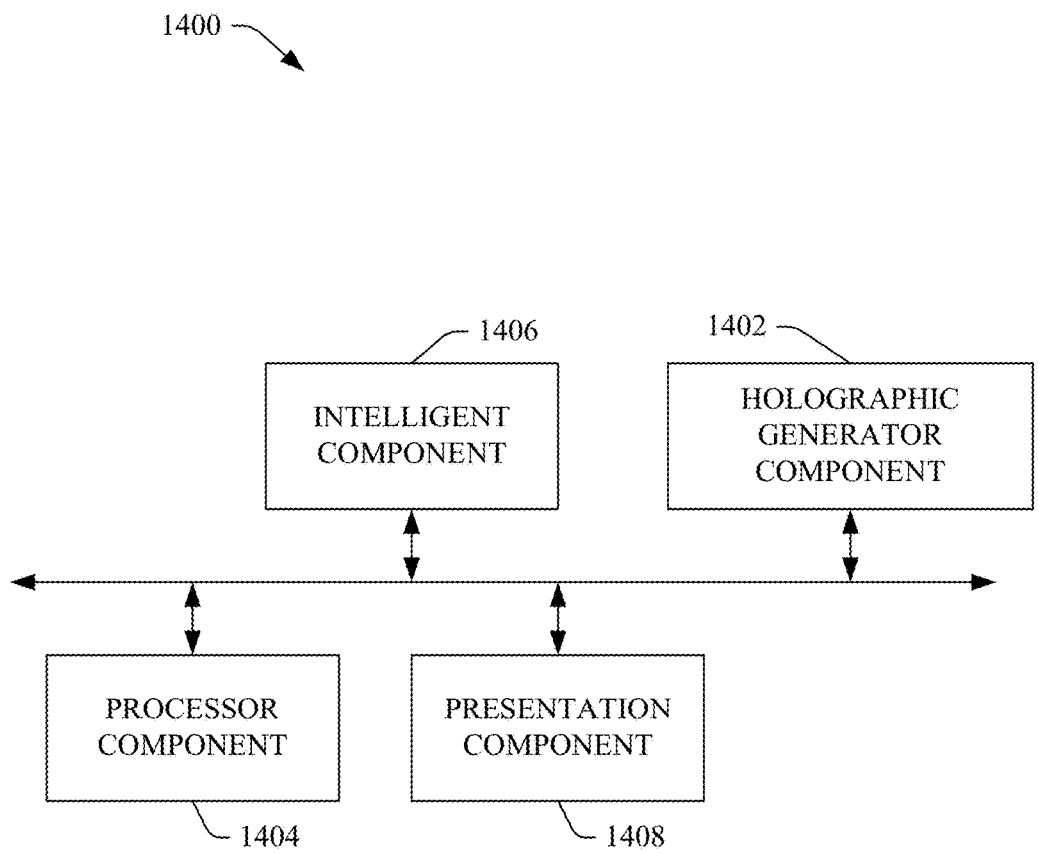
FIG. 14 depicts a system that can employ intelligence to facilitate generating holograms that can represent a real or synthetic 3-D object scene to facilitate generating holographic images based at least in part on the holograms, in accordance with various aspects and embodiments of the disclosed subject matter.

Referring to FIG. 14, depicted is a block diagram of a system 1400 that can employ intelligence to facilitate generating holograms that can represent a real or synthetic 3-D object scene to facilitate generating holographic images based at least in part on the holograms, in accordance with various aspects and embodiments of the disclosed subject matter. The system 1400 can include an HGC 1402 that can desirably use transforms to generate complex holograms that can represent an object scene (e.g., a real or computer-synthesized 3-D object scene from multiple different viewing perspectives of a 3-D object scene that can correspond to multiple different viewing perspectives of the 3-D object scene) based in part on visual images of the object scene, as more fully disclosed herein. It is to be appreciated that the HGC 1402 can be the same or similar as respective components (e.g., respectively named components), and/or can contain the same or similar functionality as respective components, as more fully described herein. The HGC 1402 can include a hologram processor component (not shown in FIG. 14; e.g., as depicted in, or described herein in relation to FIG. 1) that can perform and/or control various operations to facilitate generating holograms that can represent an object scene, wherein reconstructed holographic images, which can be generated using the holograms, can be desirably displayed (e.g., with favorable or at least acceptable quality and resolution) on a display component (e.g., a display device, such as a SLM display device or a LCoS display device), as more fully disclosed herein.

The system 1400 can further include a processor component 1404 that can be associated with (e.g., communicatively connected to) the HGC 1402 and/or other components (e.g., components of system 1400) via a bus. In accordance with an embodiment of the disclosed subject matter, the processor component 1404 can be an applications processor(s) that can manage communications and run applications. For example, the processor component 1404 can be a processor that can be utilized by a computer, mobile computing device, personal data assistant (PDA), or other electronic computing device. The processor component 1404 can generate commands in order to facilitate applying a first transform (e.g., non-uniform transform) to visual images of an object scene to generate a first signal(s), applying a second transform to the first signal(s) to generate holograms that can represent the object scene, applying another transform(s) to data or functions to facilitate generating holograms, generating a WRP associated with a visual image, converting a WRP to a hologram, determining a sampling array, determining new sample positions for each pixel associated with a visual image, generating holographic images based in part on the holograms, and/or displaying of holographic images of the object scene (e.g., 3-D object scene) from multiple different viewing perspectives corresponding to the multiple different viewing perspectives of the object scene obtained or created by the HGC 1402, modifying parameters associated with the HGC 1402, etc.

The system 1400 also can include an intelligent component 1406 that can be associated with (e.g., communicatively connected to) the HGC 1402, the processor component 1404, and/or other components associated with system 1400 to facilitate analyzing data, such as current and/or historical information, and, based at least in part on such information, can make an inference(s) and/or a determination(s) regarding, for example, a type of transform to apply to the visual image, to a first signal derived from applying another transform to the visual image, or to data or functions, generation of a WRP associated with a visual image, conversion of a WRP to a hologram, determination of a sampling array, determination of new sample positions for pixels associated with a visual image, a size of the complex hologram to be generated, a hologram generation algorithm to use to generate complex holograms, and/or generation of complex holograms based at least in part on the visual images and the transforms, to facilitate generating 3-D holograms (e.g., full-parallax 3-D complex Fresnel holograms that can based at least in part on the visual images of a 3-D object scene), generating corresponding 3-D holographic images that can represent a 3-D object scene based in part on the 3-D holograms, determining and/or setting of parameters associated with the HGC 1402 and associated components, etc.

For example, based in part on current and/or historical evidence, the intelligent component 1406 can infer or determine a type of transform to apply to the visual image, to a first signal derived from applying another transform to the visual image, or to data or functions, a WRP, a hologram from conversion of a WRP, a sampling array, new sample positions for pixels associated with a visual image, a size of the complex hologram to be generated, a hologram generation algorithm to use to generate complex holograms, respective parameter values of one or more parameters to be used with regard to the performing of operations by the HGC 1402, etc.

In an aspect, the intelligent component 1406 can communicate information related to the inferences and/or determinations to the HGC 1402. Based at least in part on the inference(s) or determination(s) made by the intelligent component 1406, the HGC 1402 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 1402. For instance, the HGC 1402 can determine, identify, and/or select a type of transform to apply to the visual image, to a first signal derived from applying another transform to the visual image, or to data or functions, a WRP, a hologram from conversion of a WRP, a sampling array, new sample positions for pixels associated with a visual image, a size of the complex hologram to be generated, a hologram generation algorithm to use to generate complex holograms, respective parameter values of one or more parameters to be used with regard to the performing of operations by the HGC 1402, etc., to facilitate generating 3-D holograms (e.g., 3-D complex holograms) and/or corresponding 3-D holographic images of a 3-D object scene, as disclosed herein.

It is to be understood that the intelligent component 1406 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1400 also can include a presentation component 1408, which can be connected with the processor component 1404. The presentation component 1408 can provide various types of user interfaces to facilitate interaction between a user and any component coupled to the processor component 1404. As depicted, the presentation component 1408 is a separate entity that can be utilized with the processor component 1404 and associated components. However, it is to be appreciated that the presentation component 1408 and/or similar view components can be incorporated into the processor component 1404 and/or can be a stand-alone unit. The presentation component 1408 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1404.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 1402 and/or other components, can be situated or implemented on a single integrated-circuit chip. In accordance with another embodiment, the HGC 1402, and/or other components, can be implemented on an application-specific integrated-circuit (ASIC) chip. In yet another embodiment, the HGC 1402 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 15:
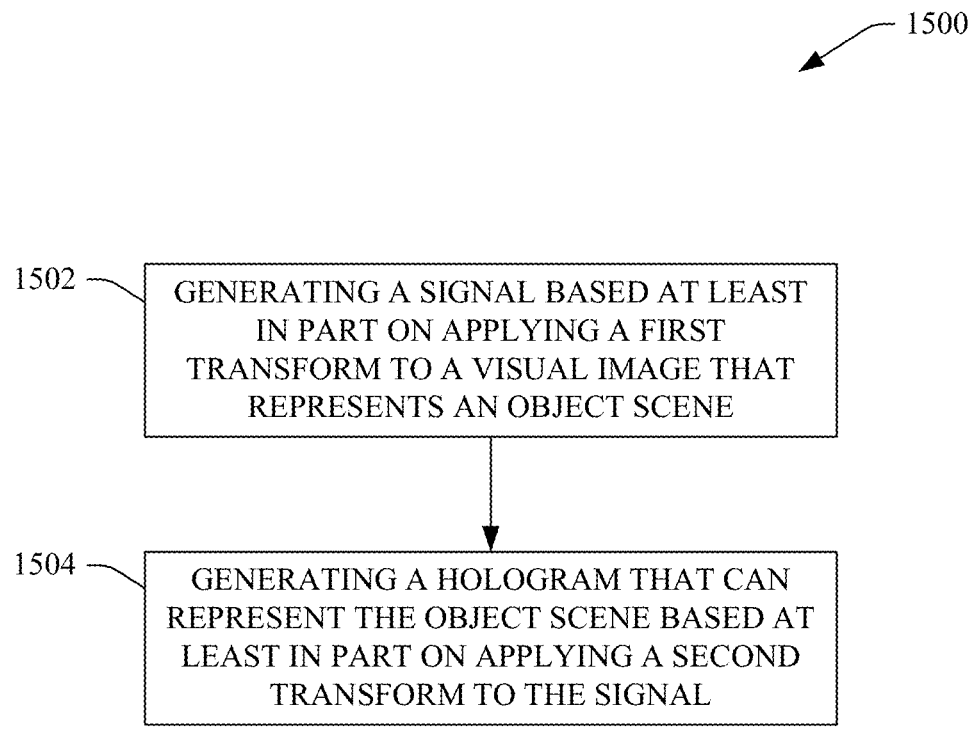
FIG. 15 illustrates a flow diagram of an example method that can efficiently and quickly generate a hologram(s) that can represent an object scene, in accordance with various aspects and embodiments of the disclosed subject matter.
Figure 16:
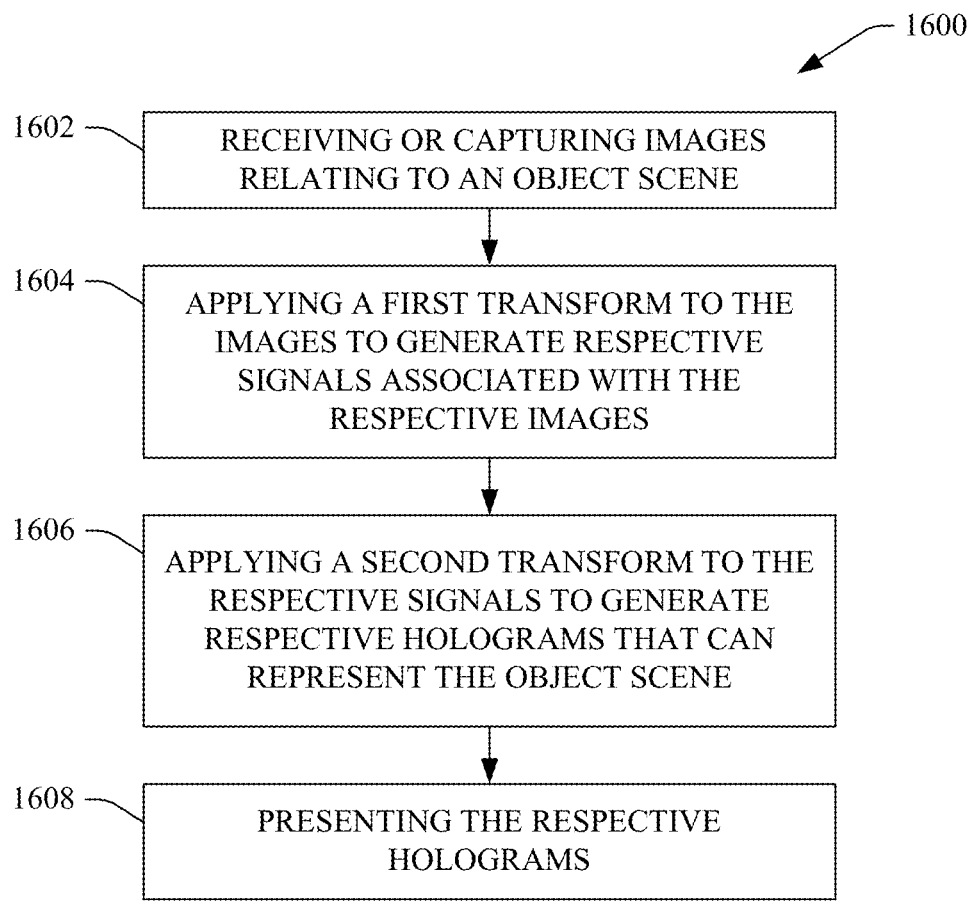
FIG. 16 depicts a flow diagram of an example method that can efficiently and quickly (e.g., at video rate or faster, in real time or at least near real time) generate holograms that can represent an object scene, in accordance with various aspects and embodiments of the disclosed subject matter.
Figure 17:
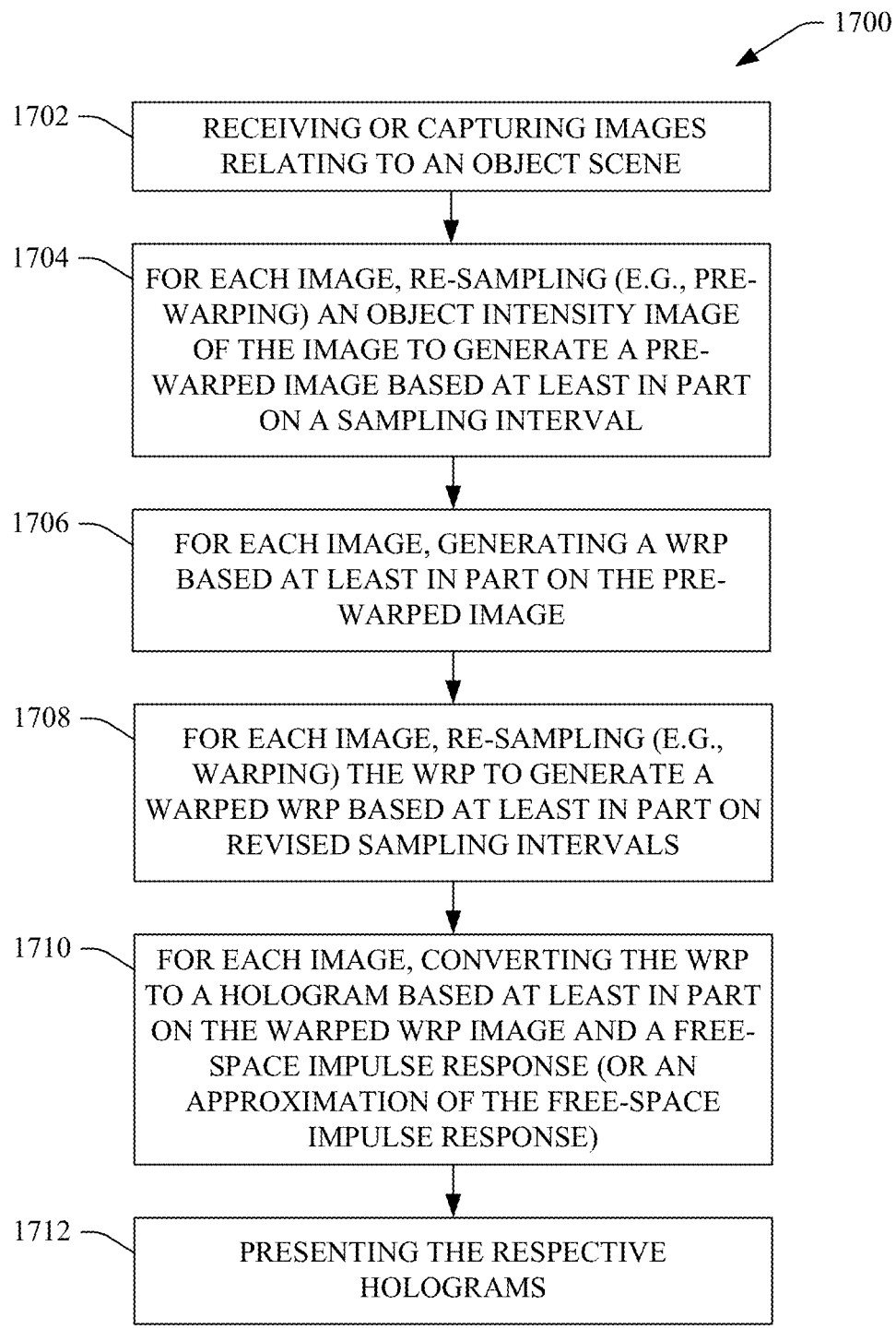
FIG. 17 illustrates a flow diagram of another example method that can efficiently and quickly (e.g., at video rate or faster, in real time or at least near real time) generate holograms that can represent an object scene, in accordance with various aspects and embodiments of the disclosed subject matter.

FIGS. 15-17 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 15, illustrated is a flow diagram of an example method 1500 that can efficiently and quickly (e.g., at video rate or faster, in real time or at least near real time) generate a hologram(s) (e.g., a 3-D complex hologram) that can represent an object scene (e.g., 3-D object scene), in accordance with various aspects and embodiments of the disclosed subject matter. The method 1500 can be implemented by an HGC comprising a hologram processor component.

At 1502, a signal can be generated based at least in part on applying a first transform to a visual image that represents an object scene. The hologram processor component can generate the signal in response to applying the first transform (e.g., a non-uniform transform) to the visual image (e.g., visual information associated with the visual image).

At 1504, a hologram that can represent the object scene can be generated based at least in part on applying a second transform to the signal. The hologram processor component can generate the hologram, which can be a full-parallax 3-D complex Fresnel hologram, in response to applying the second transform to the signal. The complex hologram can represent the original object scene from various visual perspectives (e.g., various viewing angles). A display component, which can comprise one or more display units (e.g., an SLM display device or an LCoS display device), can be employed to display holographic images based at least in part on the hologram. The holographic images can represent the original object scene from various visual perspectives (e.g., various viewing angles) that can correspond to the various visual perspectives associated with the complex hologram.

Turning to FIG. 16, depicted is a flow diagram of an example method 1600 that can efficiently and quickly (e.g., at video rate or faster, in real time or at least near real time) generate holograms that can represent an object scene, in accordance with various aspects and embodiments of the disclosed subject matter. The method 1600 can be implemented by an HGC comprising a hologram processor component, a display component, and/or another component.

At 1602, images (e.g., visual images) relating to an object scene, can be received or captured. The HGC can receive or capture the visual images relating to the object scene (e.g., 3-D object scene). The images can represent the object scene from various visual perspectives (e.g., various visual angles), and can comprise the full depth information and full parallax information (e.g., horizontal and vertical parallax information) of the object scene. The object scene can be a real or synthetic object scene.

At 1604, a first transform can be applied to the images to generate respective signals associated with the respective images. The hologram processor component can apply the first transform (e.g., non-uniform transform) to the images to generate the respective signals.

At 1606, a second transform can be applied to the respective signals to generate respective holograms that can represent the object scene. The hologram processor component can apply the second transform the respective signals to generate the respective holograms. The holograms can be complex holograms, comprising the full depth information and the full parallax information (e.g., horizontal and vertical parallax information) associated with the original object scene, that can represent the object scene. In some implementations, the hologram processor component can generate the complex hologram using a fast hologram generation algorithm that can employ the first transform and second transform, such as disclosed herein.

At 1608, the respective holograms can be presented. The HGC can facilitate presenting the respective holograms representing the object scene. A display component, which can include one or more display units (e.g., an SLM display device or an LCoS display device), can be employed to display holographic images that can be generated or reconstructed based at least in part on the holograms. For instance, the HGC and/or display component can facilitate applying a coherent light beam to the holograms to facilitate generating corresponding holographic images that can be displayed on or by the display component. The holograms and corresponding holographic images can represent the original object scene from various visual perspectives (e.g., various viewing angles) that can correspond to the various visual perspectives of the object scene, and can comprise the full depth information and full parallax information (e.g., vertical and horizontal parallax information) of the object scene.

FIG. 17 illustrates a flow diagram of another example method 1700 that can efficiently and quickly (e.g., at video rate or faster, in real time or at least near real time) generate holograms that can represent an object scene, in accordance with various aspects and embodiments of the disclosed subject matter. The method 1700 can be implemented by an HGC comprising a hologram processor component, a display component, and/or another component.

At 1702, one or more images (e.g., visual images) relating to (e.g., representing) an object scene, can be received or captured. The HGC can receive or capture one or more visual images relating to the object scene (e.g., 3-D object scene). The images can represent the object scene from various visual perspectives (e.g., various visual angles), and can comprise the full depth information and full parallax information (e.g., horizontal and vertical parallax information) of the object scene. The object scene can be a real or synthetic object scene.

At 1704, for each image, an object intensity image $I(x,y)$ of the image can be re-sampled (e.g., pre-warped) to generate a pre-warped image $I_1(x,y)$ based at least in part on a sampling interval. With respect to each image, the hologram processor component can sample pixels of the original image (e.g., original object intensity image), based at least in part on the associated depth map $D(x,y)$, to generate the pre-warped image that can correspond to the original image, in accordance with the sampling interval. The sampling interval can be uniform or non-uniform in the horizontal and/or vertical directions.

At 1706, for each image, a WRP $W(x,y)$ can be generated based at least in part on the pre-warped image. With respect to each image, the hologram processor component can generate the WRP based at least in part on the pre-warped image. For example, the hologram processor component can generate the WRP by using Equation (1) to calculate the WRP based at least in part on the pre-warped image and a free-space impulse response (or an approximation of the free-space impulse response), as more fully disclosed herein. In some implementations, to facilitate speeding up the calculation and generation of the WRP, the hologram processor component can realize the convolution of Equation (1) in the spectral domain, based at least in part on a pair of FFT operations, and can calculate the WRP using Equation (14), as more fully disclosed herein.

At 1708, for each image, the WRP can be re-sampled (e.g., warped) to generate a warped WRP $W_1(x,y)$ based at least in part on revised sampling intervals. With respect to each image, the hologram processor component can re-sample or warp the WRP to generate a warped WRP (WWRP), and can incorporate the depth map associated with the original image onto the WRP as part of generating the WWRP, based at least in part on the revised sampling intervals. For instance, the hologram processor component can determine a sampling array, comprising a revised matrix of sampling intervals (e.g., revised sampling intervals) for each pixel location, and taking into account (e.g., incorporating) the corresponding depth value for each pixel location, using, for example, Equation (8), as more fully disclosed herein.

The hologram processor component can determine, calculate, or deduce all of the elements of the sampling array. In some implementations, information for determining the sampling array can be stored in a look-up table, wherein the hologram processor component can quickly determine the sampling array based at least in on the information stored in the look-up table and performing a negligible amount of computation. With respect to each image, the hologram processor component can determine, calculate, or generate the warped WRP, based at least in part on the sampling array, by re-locating each pixel to its new position in the image according to the revised sampling intervals of the sampling array, wherein the hologram processor component can employ mapping and rounding operations, using, for example, Equations (9), (10), and (11), to facilitate generating the warped WRP, as more fully disclosed herein.

At 1710, for each image, the WRP can be converted to a hologram $H(x,y)$ based at least in part on the warped WRP image and a free-space impulse response (or an approximation of the free-space impulse response). With respect to each image, the hologram processor component can convert the WRP into a hologram that can be positioned a defined distance from the WRP, based at least in part on the warped WRP image and the free-space impulse response (or the approximation of the free-space impulse response). The hologram processor component can convert the WRP into a hologram, for example, by convolving the warped WRP image with the free-space impulse response (or the approximation of the free-space impulse response) using Equation (13). In some implementations, to facilitate speeding up the calculations and conversion of the WRP to the hologram, the hologram processor component can realize the convolution of Equation (13) in the spectral domain, based at least in part on a pair of FFT operations, and can calculate the WRP using Equation (15), as more fully disclosed herein.

At 1712, the respective holograms can be presented. The HGC can facilitate presenting the respective holograms representing the object scene. A display component, which can include one or more display units (e.g., an SLM display device or an LCoS display device), can be employed to display holographic images that can be generated or reconstructed based at least in part on the holograms. For instance, the HGC and/or display component can facilitate applying a coherent light beam to the holograms to facilitate generating corresponding holographic images that can be displayed on or by the display component. The holograms and corresponding holographic images can represent the original object scene from various visual perspectives (e.g., various viewing angles) that can correspond to the various visual perspectives of the object scene, and can comprise the full depth information and full parallax information (e.g., vertical and horizontal parallax information) of the object scene.

Figure 18:
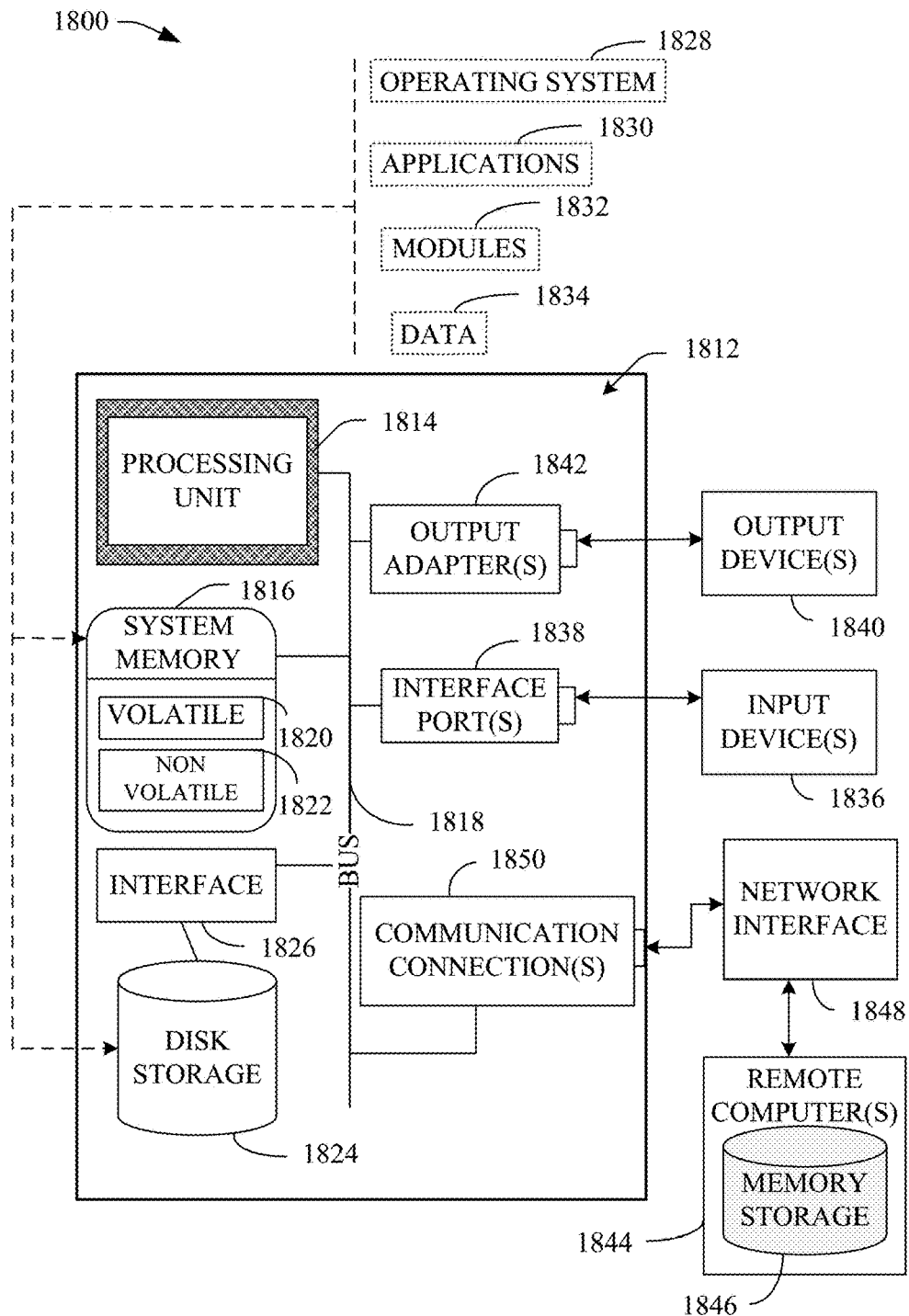
FIG. 18 is a schematic block diagram illustrating a suitable operating environment.
Figure 19:
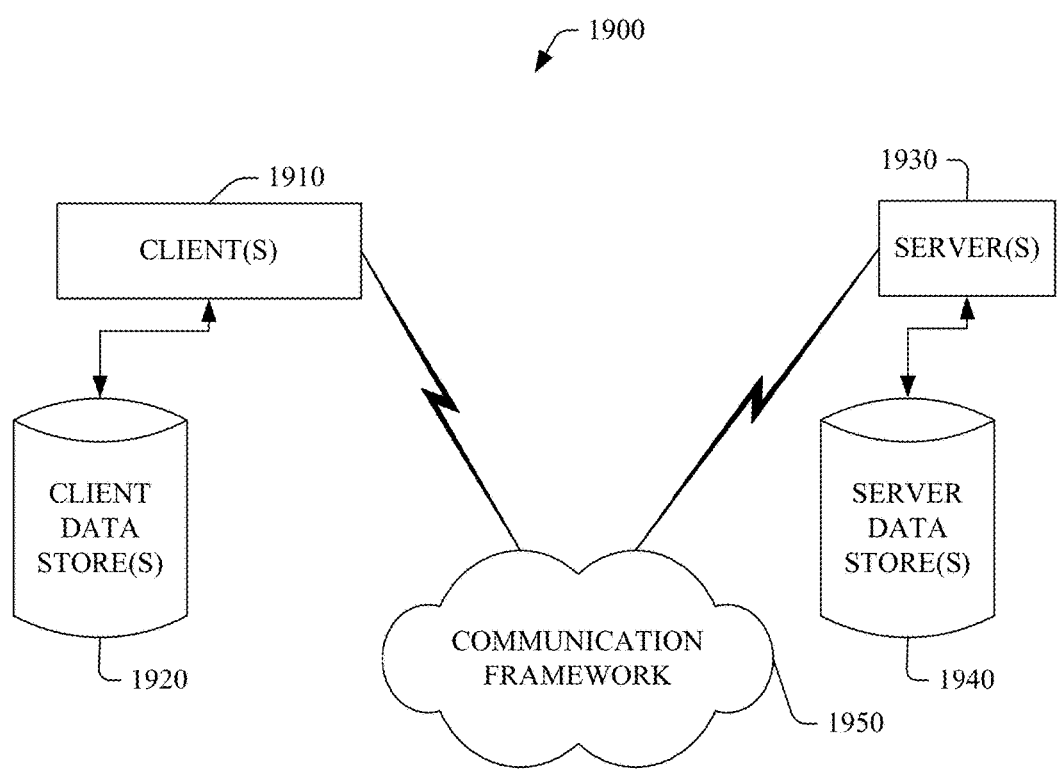
FIG. 19 is a schematic block diagram of a sample-computing environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 18, a suitable environment 1800 for implementing various aspects of the claimed subject matter includes a computer 1812. The computer 1812 includes a processing unit 1814, a system memory 1816, and a system bus 1818. It is to be appreciated that the computer 1812 can be used in connection with implementing one or more of the systems or components (e.g., holographic generator component, hologram processor component, display component, processor component, data store, etc.) shown and/or described in connection with, for example, FIGS. 1-17. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), or flash memory. Volatile memory 1820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1812 also can include removable/non-removable, volatile/non-volatile computer storage media. FIG. 18 illustrates, for example, a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used, such as interface 1826).

It is to be appreciated that FIG. 18 describes software that acts as an intermediary between users and the basic computer resources described in the suitable operating environment 1800. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the claimed subject matter can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample-computing environment 1900 with which the subject disclosure can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing the subject disclosure, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1920 that can be employed to store information local to the client(s) 1910. Similarly, the server(s) 1930 are operatively connected to one or more server data store(s) 1940 that can be employed to store information local to the servers 1930.

It is to be appreciated and understood that components (e.g., holographic generator component, hologram processor component, display component, processor component, data store, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory that stores executable components; and
   at least one processor, coupled to the at least one memory, that executes or facilitates execution of the executable components, the executable components comprising:
      a holographic generator component that receives or generates a visual image that represents an object scene; and
      a hologram processor component that:
      applies a first transform to the visual image to generate a first non-transitory signal, and applies a second transform to the first non-transitory signal to generate a second non-transitory signal that corresponds to a hologram that represents the object scene, wherein the visual image is a planar image of the object scene,
      generates a wavefront recording plane directly from the planar image,
      adjusts respective sampling intervals to facilitate incorporating respective portions of depth information of respective object points of the object scene into the wavefront recording plane at respective points of the wavefront recording plane that correspond to the respective object points of the object scene, and
      generates the hologram to have a first resolution that is same as a second resolution of the visual image in part by not downsampling the visual image during the generation of the hologram.

2. The system of claim 1, wherein the first transform is a non-linear transform.

3. The system of claim 1, wherein the hologram comprises parallax information and the depth information associated with the object scene.

4. The system of claim 3, wherein the parallax information comprises vertical parallax information and horizontal parallax information associated with the object scene.

5. The system of claim 1, wherein the hologram processor component re-samples pixels of an object intensity image associated with the visual image to generate a pre-warped image based at least in part on a sampling interval and a depth map associated with the visual image.

6. The system of claim 5, wherein the hologram processor component generates the wavefront recording plane based at least in part on the pre-warped image.

7. The system of claim 6, wherein to facilitate the generation of the wavefront recording plane, the hologram processor component generates the wavefront recording plane in part by performing a set of Fast Fourier Transform (FFT) operations.

8. The system of claim 6, wherein the hologram processor component re-samples the wavefront recording plane to generate a warped wavefront recording plane based at least in part on revised sampling intervals.

9. The system of claim 8, wherein the hologram processor component incorporates the depth information of the visual image and contained in the depth map in the wavefront recording plane, and wherein a sampling array comprises the revised sampling intervals.

10. The system of claim 8, wherein the hologram processor component determines the sampling array based at least in part on the depth map and pre-computed information, wherein the pre-computed information relates to a result obtained from a Fast Fourier Transform (FFT) operation performed on an impulse response.

11. The system of claim 8, wherein the hologram processor component converts the wavefront recording plane to generate the hologram based at least in part on the warped wavefront recording plane and an impulse response.

12. The system of claim 11, wherein to facilitate the generation of the hologram, the hologram processor component converts the wavefront recording plane to generate the hologram in part by performing Fast Fourier Transform (FFT) operations.

13. The system of claim 1, wherein the hologram processor component generates the hologram based at least in part on the wavefront recording plane.

14. The system of claim 1, wherein the hologram represents a depth range that is longer than another depth range associated with another hologram that is derivable from downsampling the visual image that represents the object scene.

15. The system of claim 1, wherein the executable components further comprise a display component that facilitates display of a holographic image based at least in part on the hologram.

16. The system of claim 15, wherein the display component comprises at least one of a spatial light modulator display device, a liquid crystal on silicon display device, or a liquid crystal display device.

17. The system of claim 1, wherein the object scene is a real or synthesized three-dimensional object scene, and the hologram is a full-parallax three-dimensional complex hologram that represents the real or synthesized three-dimensional object scene.

18. The system of claim 1, wherein the hologram processor component generates a set of holograms, comprising the hologram and at least one other hologram, that represent the object scene at least at a rate of thirty frames per second.

19. A method, comprising:
generating, by a system comprising a processor, a non-transitory signal based at least in part on a non-uniform transform applied to a visual image that represents an object scene;
generating, by the system, a hologram that represents the object scene based at least in part on another transform applied to the non-transitory signal, wherein the visual image is a planar image that represents the object scene, wherein a wavefront recording plane is produced directly from the planar image, and wherein the hologram is generated to have a first resolution that is same as a second resolution of the visual image in part by not downsampling the visual image during the generating of the hologram; and
modifying, by the system, respective sampling intervals to facilitate incorporating respective portions of depth information of respective object points of the object scene into the wavefront recording plane at respective regions of the wavefront recording plane that correspond to the respective object points of the object scene.

20. The method of claim 19, wherein the hologram preserves full parallax information and the depth information associated with the object scene.

21. The method of claim 20, wherein the full parallax information comprises vertical parallax information and horizontal parallax information associated with the object scene.

22. The method of claim 19, further comprising:
applying, by the system, the non-uniform transform to the visual image to facilitate the generating of the non-transitory signal; and
applying, by the system, the other transform to the non-transitory signal to facilitate the generating of the hologram.

23. The method of claim 19, further comprising:
re-sampling, by the system, an object intensity image associated with the visual image to generate a pre-warped image based at least in part on a sampling interval and a depth map associated with the visual image; and
generating, by the system, the wavefront recording plane based at least in part on the pre-warped image.

24. The method of claim 23, further comprising:
determining, by the system, revised sampling intervals based at least in part on the depth information contained in the depth map; and
re-sampling, by the system, the wavefront recording plane to generate a warped wavefront recording plane based at least in part on the revised sampling intervals.

25. The method of claim 24, wherein the generating of the warped wavefront recording plane is facilitated by re-locating respective pixels of the wavefront recording plane to respective new positions in accordance with the revised sampling intervals.

26. The method of claim 25, further comprising:
performing, by the system, a point mapping operation on a pixel of the respective pixels; and
determining, by the system, a new position of the pixel based at least in part on a result of the performing of the point mapping operation, wherein the performing of the point mapping operation comprises performing a rounding operation on a real number value to determine an integer number value relating to the new position.

27. The method of claim 24, further comprising:
converting, by the system, the wavefront recording plane to generate the hologram based at least in part on the warped wavefront recording plane and an impulse response.

28. The method of claim 19, further comprising:
generating, by the system, a holographic image based at least in part on illuminating the hologram; and
displaying, by the system, the holographic image.

29. The method of claim 19, wherein the object scene is a real or synthesized three-dimensional object scene, and the hologram is a full-parallax three-dimensional complex hologram that represents the real or synthesized three-dimensional object scene.

30. A non-transitory computer-readable medium storing computer-executable instructions that, in response to execution, cause a system comprising a processor to perform operations, comprising:
applying a first transform to a visual image that represents an object scene to generate a first non-transitory signal;
applying a second transform to the first non-transitory signal to generate a second non-transitory signal that corresponds to a hologram that represents the object scene, wherein the visual image is a planar image that represents the object scene, wherein a wavefront recording plane is generated from the planar image and is not generated from individual object points of the visual image, and wherein the hologram has a first resolution that is same or substantially the same as a second resolution of the visual image in part by not downsampling the visual image during generation of the hologram; and
adjusting respective sampling intervals to facilitate incorporating respective depth values representing respective depth characteristics of respective portions of the object scene into the wavefront recording plane at respective regions of respective points of the wavefront recording plane that correspond to the respective portions of the object scene.

31. The non-transitory computer-readable medium of claim 30, wherein the first transform is a non-linear transform.

32. The non-transitory computer-readable medium of claim 30, wherein the operations further comprise:
generating a holographic image based at least in part on applying a light source to the hologram; and
displaying the holographic image.

33. A system, comprising:
means for generating a non-transitory signal based at least in part on applying a non-uniform transform to a visual image that represents an object scene; and
means for generating a hologram that represents the object scene based at least in part on applying another transform to the non-transitory signal, wherein the visual image is a planar image that represents the object scene, wherein a wavefront recording plane is generated from the planar image, wherein respective sampling intervals are modified to facilitate incorporating respective depth information of respective object points into the wavefront recording plane at respective points of the wavefront recording plane that correspond to the respective object points of the object scene, and wherein the hologram is generated to have a first resolution that is same as a second resolution of the visual image in part by not downsampling the visual image during the generating of the hologram.

34. The system of claim 33, further comprising:
means for generating a holographic image in response to illuminating the hologram; and
means for presenting the holographic image.

* * * * *